US012259598B2

(12) United States Patent
Zhang et al.

(10) Patent No.: US 12,259,598 B2
(45) Date of Patent: Mar. 25, 2025

(54) OPTICAL DEFOCUS LENS AND METHOD FOR IMPLEMENTING OPTICAL DEFOCUS

(71) Applicant: HUAWEI TECHNOLOGIES CO., LTD., Guangdong (CN)

(72) Inventors: Youming Zhang, Shenzhen (CN); Zhixiang Fan, Shenzhen (CN); Lifeng Sun, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/512,526

(22) Filed: Nov. 17, 2023

(65) Prior Publication Data

US 2024/0094560 A1 Mar. 21, 2024

Related U.S. Application Data

(63) Continuation of application No. PCT/CN2021/095077, filed on May 21, 2021.

(51) Int. Cl.
G02C 7/08 (2006.01)
G02F 1/29 (2006.01)

(52) U.S. Cl.
CPC .............. *G02C 7/083* (2013.01); *G02F 1/29* (2013.01); *G02C 2202/16* (2013.01); *G02F 2203/07* (2013.01)

(58) Field of Classification Search
CPC ...... G02C 7/083; G02C 2202/16; G02C 7/06; G02C 7/022; G02C 11/10; G02C 2202/24; G02F 1/29; G02F 2203/07; G02F 1/1337; G02F 1/1347; G02F 1/295; G02B 3/10; G02B 3/14
See application file for complete search history.

(56) References Cited

U.S. PATENT DOCUMENTS

| 5,712,721 | A | * | 1/1998 | Large | G02C 7/101 |
| | | | | | 351/44 |
| 10,261,344 | B2 | * | 4/2019 | Pugh | C09K 19/38 |
| 10,274,719 | B2 | * | 4/2019 | Chen | G02B 3/12 |
| 11,815,746 | B1 | * | 11/2023 | Li | G02F 1/294 |
| 2020/0033694 | A1 | * | 1/2020 | Gao | G02F 1/29 |
| 2021/0325727 | A1 | * | 10/2021 | Wang | G02F 1/133526 |

(Continued)

FOREIGN PATENT DOCUMENTS

| CN | 103472595 A | 12/2013 |
| CN | 104102022 A | 10/2014 |

(Continued)

*Primary Examiner* — Ryan Crockett
(74) *Attorney, Agent, or Firm* — WOMBLE BOND DICKINSON (US) LLP

(57) ABSTRACT

An optical defocus lens includes: a first lens layer and at least one liquid crystal lens layer, where the first lens layer is a concave lens, a convex lens, or a plano lens, a refractive index of liquid crystal molecules in each of the at least one liquid crystal lens layer is controlled by an electric field, to converge or diverge polarized light that is incident to a direction of each liquid crystal lens layer to form a focal point; a first liquid crystal lens layer is configured to converge or diverge polarized light in a first direction to form a first focal point; and the first lens layer or a second liquid crystal lens layer is configured to converge or diverge polarized light in a second direction to form a second focal point.

20 Claims, 10 Drawing Sheets

(56) References Cited

U.S. PATENT DOCUMENTS

| 2022/0236589 A1* | 7/2022 | Le Saux | G02C 7/085 |
| 2022/0252904 A1* | 8/2022 | Hones, Jr. | G02C 7/083 |
| 2024/0168342 A1* | 5/2024 | Russell | G02F 1/294 |

FOREIGN PATENT DOCUMENTS

| CN | 103592778 B | 3/2015 |
| CN | 107085316 A | 8/2017 |
| CN | 109799628 A | 5/2019 |
| WO | 2020219518 A1 | 10/2020 |
| WO | 2020245375 A1 | 12/2020 |

* cited by examiner (a)            (b)

(a)            (b)

Focal point of a treatment region   Focal point of a vision correction region

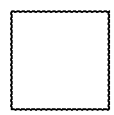 : Liquid crystal non-lens region
 : Liquid crystal lens region
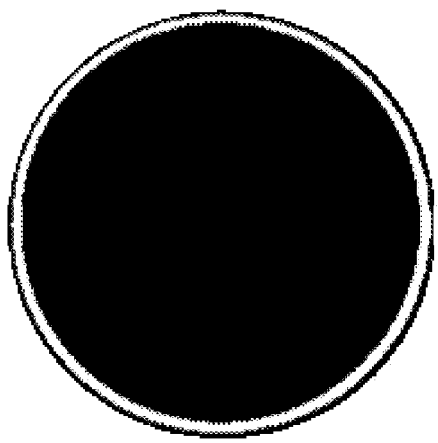
(a)
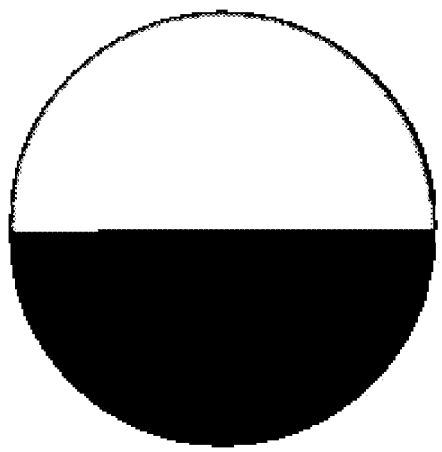
(b)
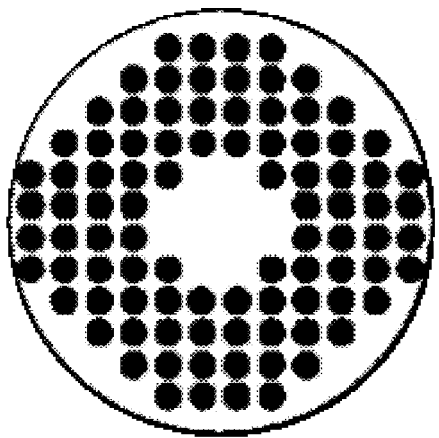
(c)
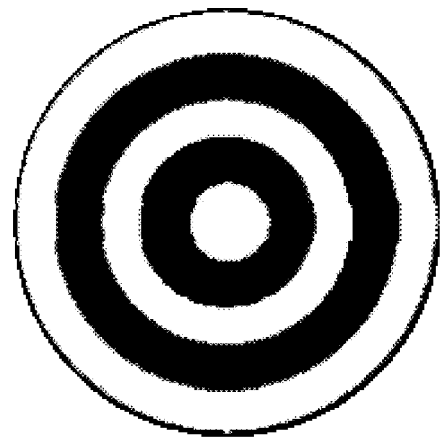
(d)
FIG. 8

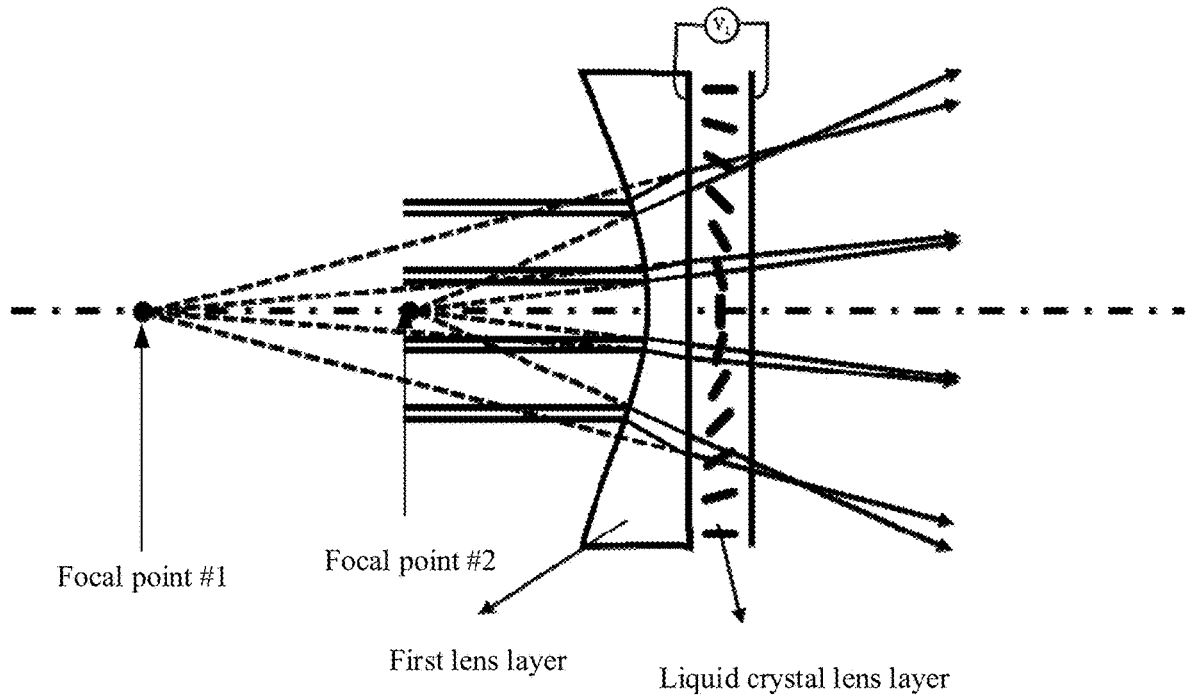

Focal point #1  Focal point #2

First lens layer    Liquid crystal lens layer

FIG. 12

| A first liquid crystal lens layer in at least one liquid crystal lens layer converges or diverges polarized light in a first direction under control of a first electric field, to form a first focal point | 1310 |

| A first lens layer converges or diverges polarized light in a second direction to form a second focal point, or a second liquid crystal lens layer in the at least one liquid crystal lens layer converges or diverges the polarized light in the second direction under control of a second electric field, to form the second focal point | 1320 |

FIG. 13

OPTICAL DEFOCUS LENS AND METHOD FOR IMPLEMENTING OPTICAL DEFOCUS

CROSS-REFERENCE TO RELATED APPLICATIONS

This application is a continuation of International Application No. PCT/CN2021/095077, filed on May 21, 2021, the disclosure of which is hereby incorporated by reference in its entirety.

TECHNICAL FIELD

This disclosure relates to the field of lens technologies, and in particular, to an optical defocus lens and a method for implementing optical defocus.

BACKGROUND

Myopia is a very common eye disease. It is estimated that 1.5 billion people worldwide are suffering from myopia. In recent years, due to the widespread popularity of consumer electronics, a rate of myopia among adolescents and children has increased year by year. Myopia is particularly serious in China. According to data from the National Health Commission, the overall myopia rate of adolescents and children in China was as high as 53.6% in 2018, which clearly shows that more adolescents and children tend to suffer from myopia. Prevention of myopia and prevention of myopia from becoming worse are major problems that need to be paid attention to and resolved by the whole society.

A current myopia prevention and control method is to wear an optical defocus lens. However, an existing optical defocus lens has a relatively long processing period and relatively high costs. Therefore, how to implement optical defocus while shortening the processing period and reducing production costs becomes an urgent problem to be resolved.

SUMMARY

This disclosure provides an optical defocus lens, so as to implement optical defocus while shortening a processing period and reducing production costs.

According to a first aspect, an optical defocus lens is provided, including:

a first lens layer and at least one liquid crystal lens layer, where the first lens layer is a concave lens, a convex lens, or a plano lens, a refractive index of liquid crystal molecules in each of the at least one liquid crystal lens layer is controlled by an electric field, to converge or diverge polarized light that is incident to a direction of each liquid crystal lens layer to form a focal point; a first liquid crystal lens layer in the at least one liquid crystal lens layer is configured to converge or diverge polarized light in a first direction to form a first focal point; and the first lens layer or a second liquid crystal lens layer in the at least one liquid crystal lens layer is configured to converge or diverge polarized light in a second direction to form a second focal point, where the second liquid crystal lens layer is different from the first liquid crystal lens layer, the second direction is different from the first direction, and positions of the first focal point and the second focal point are different.

According to the optical defocus lens provided in an embodiment of the disclosure, at least two focal points at different positions can be formed. In addition, because a refractive index of liquid crystal molecules at the liquid crystal lens layer that forms the focal point is controlled by the electric field, a position in which the focal point is formed may be controlled by the electric field, so that optical defocus can be implemented while shortening a processing period and reducing production costs.

With reference to the first aspect, in an embodiment of the first aspect, when a magnitude of the electric field changes, the position in which the focal point formed by the liquid crystal lens layer changes.

In addition, when the magnitude of the electric field is 0, the liquid crystal lens layer does not form a focal point.

The position of the focal point may be adjusted by adjusting a magnitude of an electric field, or the focal point may be formed by closing the liquid crystal lens layer. For example, for different eye distances, optimal optical defocus amounts required for myopia prevention and control are different. The position of the focal point formed by the liquid crystal lens layer may be adjusted by adjusting the magnitude of the electric field, to adjust the optical defocus amount, so as to avoid that only a fixed optical defocus amount can be selected, thereby preventing a myopia prevention and control effect is affected. For another example, in a scenario in which an optical defocus function is not required, the magnitude of the electric field may be adjusted (for example, no electric field is applied), so that the liquid crystal lens layer does not form a focal point, and a defocus function is disabled.

It should be noted that, when the second focal point is formed by the first lens layer, the position of the second focal point cannot be adjusted; or when the second focal point is formed by the second liquid crystal lens layer, the position of the second focal point may be adjusted by adjusting the magnitude of the electric field.

In addition, it should be further noted that, when the optical defocus lens is applied to a myopia prevention and control scenario, the liquid crystal lens layer is configured to diverge polarized light to form a focal point, and the focal point is a virtual focal point; and when the optical defocus lens is applied to a hyperopia prevention and control scenario, the liquid crystal lens layer is configured to converge polarized light to form a focal point, and the focal point is a real focal point.

With reference to the first aspect, in an embodiment of the first aspect, the liquid crystal lens layer includes a plurality of liquid crystal lens regions, and a refractive index of liquid crystal molecules in each of the plurality of liquid crystal lens regions is controlled by an electric field, to converge or diverge polarized light that is incident to a direction of each liquid crystal lens region to form a focal point.

There may be a plurality of liquid crystal lens regions at the liquid crystal lens layer in an embodiment of the disclosure, so that imaging quality of the liquid crystal lens layer can be improved and a zoom range of the liquid crystal lens layer can be expanded.

With reference to the first aspect, in an embodiment of the first aspect, the liquid crystal lens layer further includes a non-liquid crystal lens region, and a refractive index of liquid crystal molecules in the non-liquid crystal lens region is not controlled by an electric field.

With reference to the first aspect, in an embodiment of the first aspect, focal powers of the liquid crystal molecules in the at least two of the plurality of liquid crystal lens regions are different, or refractive index distribution of liquid crystal molecules in at least two of the plurality of liquid crystal lens regions is different.

It may be understood that the refractive index distribution of the liquid crystal molecules in different liquid crystal lens regions is different, and therefore focal powers of the liquid crystal molecules in the different liquid crystal lens regions are different, so that the different liquid crystal lens regions can converge or diverge polarized light in a direction to form different focal points. The liquid crystal lens layer in the optical defocus lens provided in an embodiment of the disclosure may include a plurality of liquid crystal lens regions, and refractive index distribution of liquid crystal molecules in at least two of the plurality of liquid crystal lens regions is different, so that different regions at the liquid crystal lens layer can generate different focal points, and requirements for defocus amounts in different positions can be met. For example, a gradient defocus amount can be achieved according to a user requirement (for example, the user has different clarity when viewing an object in different positions by using the optical defocus lens).

With reference to the first aspect, in an embodiment of the first aspect, liquid crystal molecules in different liquid crystal lens regions at the at least two liquid crystal lens regions are controlled by different electric fields, and different electric fields correspond to different voltages, or liquid crystal materials of different liquid crystal lens regions at the at least two liquid crystal lens regions are different.

For example, the first liquid crystal lens layer includes a liquid crystal lens region #1 and a liquid crystal lens region #2, and refractive index distribution of liquid crystal molecules in the liquid crystal lens region #1 is different from refractive index distribution of liquid crystal molecules in the liquid crystal lens region #2 (for example, an electric field controlling a refractive index of the liquid crystal molecules in the liquid crystal lens region #1 is an electric field #1, an electric field controlling a refractive index of the liquid crystal molecules in the liquid crystal lens region #2 is an electric field #2, and the electric field #1 and the electric field #2 are of different magnitudes. Alternatively, for example, liquid crystal materials of the liquid crystal lens region #1 and the liquid crystal lens region #2 are different).

A focal power of the liquid crystal lens region #1 is a focal power #1, and a focal power of the liquid crystal lens region #2 is a focal power #2, where the focal power #1 is different from the focal power #2. The liquid crystal lens region #1 is used to converge or diverge polarized light in the first direction to form a first focal point #1, and the liquid crystal lens region #2 is used to converge or diverge the polarized light in the first direction to form a first focal point #2.

Different electric fields of different liquid crystal lens regions or different liquid crystal materials of different liquid crystal lens regions are controlled, so as to implement different refractive index distribution of different liquid crystal lens regions, thereby improving flexibility of the solution.

With reference to the first aspect, in an embodiment of the first aspect, the at least one liquid crystal lens layer includes a first liquid crystal lens layer and a second liquid crystal lens layer, and refractive index distribution of liquid crystal molecules in the first liquid crystal lens layer is different from refractive index distribution of liquid crystal molecules in the second liquid crystal lens layer.

Refractive index distribution of different liquid crystal lens layers included in the optical defocus lens provided in an embodiment of the disclosure is different, so that optical defocus can be implemented.

With reference to the first aspect, in an embodiment of the first aspect, the first liquid crystal lens layer includes a first alignment layer, and an alignment direction of the first alignment layer is the first direction; and the second liquid crystal lens layer includes a second alignment layer, an alignment direction of the second alignment layer is the second direction, and the first direction is orthogonal to the second direction; and that the first lens layer or a second liquid crystal lens layer in the at least one liquid crystal lens layer is configured to converge or diverge polarized light in a second direction to form a second focal point is: the second liquid crystal lens layer is configured to converge or diverge the polarized light in the second direction to form the second focal point.

With reference to the first aspect, in an embodiment of the first aspect, the optical defocus lens includes the first lens layer, the first liquid crystal lens layer, and the second liquid crystal lens layer, the first liquid crystal lens layer includes a first alignment layer, an alignment direction of the first alignment layer is the first direction, the second liquid crystal lens layer includes a second alignment layer, and an alignment direction of the second alignment layer is the second direction; the first direction and the second direction are different but are not orthogonal; and the first liquid crystal lens layer is configured to converge or diverge the polarized light in the first direction to form the first focal point; the second liquid crystal lens layer is configured to converge or diverge the polarized light in the second direction to form the second focal point; and the first lens layer is configured to converge or diverge polarized light in a third direction to form a third focal point, and a position of the third focal point is different from a position of the first focal point or a position of the second focal point.

When the first direction and the second direction are different but are not orthogonal, the first lens layer in the optical defocus lens can also converge or diverge polarized light that is incident to the first lens layer to form a focal point, so as to generate more focal points. For the optical defocus lens, there are a plurality of defocus amounts. When a user uses the optical defocus lens, different defocus amount requirements can be met according to a requirement of the user.

With reference to the first aspect, in an embodiment of the first aspect, the liquid crystal lens layer includes a transparent substrate and an annular electrode layer, the annular electrode layer includes a plurality of annular electrodes, and electrode lines of the plurality of annular electrodes are led out through the transparent substrate.

The electrode lines of the annular electrode in the annular electrode layer of the liquid crystal lens layer in the optical defocus lens provided in an embodiment of the disclosure may be led out through a transparent substrate of the liquid crystal lens layer, to reduce impact of an electric field generated by the electrode lines on a refractive index of liquid crystal molecules.

With reference to the first aspect, in an embodiment of the first aspect, a high-impedance transparent material is filled between the plurality of annular electrodes.

A high-impedance transparent material may be filled between the annular electrodes in the annular electrode layer of the liquid crystal lens layer in the optical defocus lens provided in an embodiment of the disclosure, to avoid mutual impact between the annular electrodes.

With reference to the first aspect, in an embodiment of the first aspect, the optical defocus lens further includes a power supply and a voltage control circuit, and the power supply and the voltage control circuit are configured to generate the electric field.

According to a second aspect, a method for implementing optical defocus is provided, applied to an optical defocus lens, the optical defocus lens includes a first lens layer and at least one liquid crystal lens layer, the first lens layer is a concave lens, a convex lens, or a plano lens, and a refractive index of liquid crystal molecules in each of the at least one liquid crystal lens layer is controlled by an electric field; and the method includes: a first liquid crystal lens layer in the at least one liquid crystal lens layer converges or diverges polarized light in a first direction under control of a first electric field to form a first focal point; and the first lens layer converges or diverges polarized light in a second direction to form a second focal point, or a second liquid crystal lens layer in the at least one liquid crystal lens layer converges or diverges the polarized light in the second direction to form a second focal point, where the second liquid crystal lens layer is different from the first liquid crystal lens layer, the second direction is different from the first direction, and positions of the first focal point and the second focal point are different.

According to the method for implementing optical defocus provided in an embodiment of the disclosure, the optical defocus lens can form at least two focal points in different positions. In addition, because the refractive index of liquid crystal molecules at the liquid crystal lens layer that forms the focal point is controlled by an electric field, a position in which the focal point is formed may be controlled by the electric field, and optical defocus does not need to be implemented through customization based on an individual difference, so that optical defocus can be implemented while shortening a processing period and reducing production costs.

With reference to the second aspect, in an embodiment of the second aspect, the method further includes: adjusting, based on a change of a magnitude of the electric field, the position of the focal point formed by the liquid crystal lens layer.

In addition, when the magnitude of the electric field is 0, the liquid crystal lens layer does not form a focal point.

The position of the focal point may be adjusted by adjusting a magnitude of an electric field, or the focal point may be formed by closing the liquid crystal lens layer. For example, for different eye distances, optimal optical defocus amounts required for myopia prevention and control are different. The position of the focal point formed by the liquid crystal lens layer may be adjusted by adjusting the magnitude of the electric field, to adjust the optical defocus amount, so as to avoid that only a fixed optical defocus amount can be selected, thereby preventing a myopia prevention and control effect is affected. For another example, in a scenario in which an optical defocus function is not required, the magnitude of the electric field may be adjusted (for example, no electric field is applied), and a defocus function is disabled.

With reference to the second aspect, in an embodiment of the second aspect, the liquid crystal lens layer includes a plurality of liquid crystal lens regions, and a refractive index of liquid crystal molecules in each of the plurality of liquid crystal lens regions is controlled by an electric field, to converge or diverge polarized light that is incident to a direction of each liquid crystal lens region to form a focal point.

There may be a plurality of liquid crystal lens regions at the liquid crystal lens layer in an embodiment of the disclosure, so that imaging quality of the liquid crystal lens layer can be improved and a zoom range of the liquid crystal lens layer can be expanded.

With reference to the second aspect, in an embodiment of the second aspect, the liquid crystal lens layer further includes a non-liquid crystal lens region, and a refractive index of liquid crystal molecules in the non-liquid crystal lens region is not controlled by an electric field.

With reference to the second aspect, in an embodiment of the second aspect, refractive index distribution of liquid crystal molecules in at least two of the plurality of liquid crystal lens regions is different, where liquid crystal molecules in different liquid crystal lens regions at the at least two liquid crystal lens regions are controlled by different electric fields, or liquid crystal materials of different liquid crystal lens regions at the at least two liquid crystal lens regions are different.

The liquid crystal lens layer may include a plurality of liquid crystal lens regions, and refractive index distribution of liquid crystal molecules in at least two of the plurality of liquid crystal lens regions is different, so that different regions at the liquid crystal lens layer can generate different focal points, and requirements for defocus amounts in different positions can be met. For example, a gradient defocus amount can be achieved according to a user requirement (for example, the user has different clarity when viewing an object in different positions by using the optical defocus lens).

With reference to the second aspect, in an embodiment of the second aspect, the optical defocus lens includes the first lens layer, the first liquid crystal lens layer, and the second liquid crystal lens layer; and the method includes: The first liquid crystal lens layer converges or diverges the polarized light in the first direction under control of the first electric field to form the first focal point; the second liquid crystal lens layer converges or diverges the polarized light in the second direction under control of the second electric field to form the second focal point; and the first lens layer converges or diverges polarized light in a third direction to form a third focal point, where a position of the third focal point is different from a position of the first focal point or a position of the second focal point.

The first lens layer in the optical defocus lens can also converge or diverge polarized light that is incident to the first lens layer to form a focal point, so as to generate more focal points. For the optical defocus lens, there are a plurality of defocus amounts. When a user uses the optical defocus lens, different defocus amount requirements can be met according to a requirement of the user.

With reference to the second aspect, in an embodiment of the second aspect, the method further includes: generating the electric field based on a power supply and a voltage control circuit, where the power supply and the voltage control circuit are disposed on the optical defocus lens, or disposed on glasses including the optical defocus lens.

According to the method for implementing optical defocus provided in an embodiment of the disclosure, the power supply and the voltage control circuit for controlling the magnitude of the electric field may be disposed on glasses, a glasses frame, or a glasses leg, thereby improving flexibility of the solution.

According to a third aspect, an apparatus for implementing optical defocus is provided. The apparatus includes a processor, configured to implement the method according to the second aspect.

In an embodiment, the apparatus for implementing optical defocus may further include a memory. The memory is coupled to the processor, and the processor is configured to implement the method according to the second aspect.

In an embodiment, the memory is configured to store program instructions and data. The memory is coupled to the processor. The processor may execute the program instructions stored in the memory, to implement the method according to the second aspect.

In an embodiment, the communication apparatus further includes a communication interface, and the communication interface is used by the apparatus for implementing optical defocus to communicate with another device. The communication interface may be a transceiver, an input/output interface, a circuit, or the like.

In an embodiment, the apparatus for implementing optical defocus includes a processor and a communication interface.

The processor communicates with outside through the communication interface.

The processor is configured to run a computer program, so that the apparatus for implementing optical defocus implements the method according to the second aspect.

It may be understood that the outside may be an object other than the processor or an object other than the apparatus.

In another possible design, the apparatus for implementing optical defocus is a chip or a chip system. The communication interface may be an input/output interface, an interface circuit, an output circuit, an input circuit, a pin, a related circuit, or the like in the chip or the chip system. The processor may alternatively be embodied as a processing circuit or a logic circuit.

According to a fourth aspect, this disclosure further provides a computer-readable storage medium. The computer-readable storage medium stores instructions. When the instructions are run on a computer, the computer is enabled to perform the method according to the second aspect.

According to a fifth aspect, this disclosure provides a computer program product including instructions. When the computer program product runs on a computer, the computer is enabled to perform the method according to the second aspect.

According to a sixth aspect, glasses are provided, including a power supply, a voltage control circuit, and the optical defocus lens according to the first aspect, where the power supply and the voltage control circuit are configured to generate the foregoing electric field.

With reference to the sixth aspect, in an embodiment of the sixth aspect, the glasses further include:

a glasses frame and glasses legs, where the power supply and the voltage control circuit are disposed on the glasses frame and/or the glasses leg.

With reference to the sixth aspect, in an embodiment of the sixth aspect, the power supply and the voltage control circuit are disposed on the optical defocus lens.

The power supply and voltage control circuit for generating the electric field may be disposed on the optical defocus lens, the glasses frame, or the glasses leg, thereby improving flexibility of the solution.

According to a seventh aspect, a chip or a chip system is provided. The chip or the chip system includes at least one processor and a communication interface. The communication interface and the at least one processor are interconnected by using a line. The at least one processor is configured to run a computer program or instructions to perform the method according to the second aspect. The communication interface in the chip may be an input/output interface, a pin, a circuit, or the like.

In an embodiment, the chip or the chip system described in this disclosure further includes at least one memory, and the at least one memory stores instructions. The memory may be a storage unit inside the chip, for example, a register or a cache, or may be a storage unit (for example, a read-only memory or a random access memory) of the chip.

BRIEF DESCRIPTION OF DRAWINGS

FIG. 12 is a schematic diagram of optical defocus of another optical defocus lens according to an embodiment of this disclosure;
FIG. 13 is a schematic flowchart of an optical defocus method according to an embodiment of this disclosure.

DESCRIPTION OF EMBODIMENTS

The following describes technical solutions of this disclosure with reference to accompanying drawings.

Figure 1:
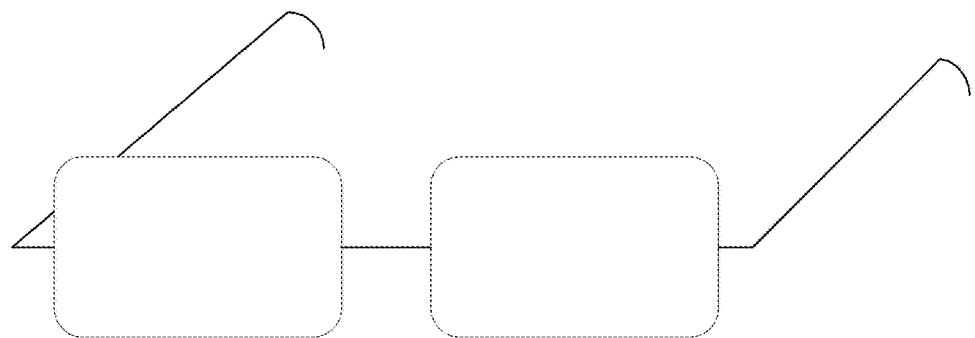
FIG. 1 is a schematic diagram of a glasses frame;
(a) and (b) in FIG. 2 are schematic diagrams of a myopia principle;
(a) and (b) in FIG. 3 are schematic diagrams of imaging of different myopia types.

The optical defocus lens provided in an embodiment of the disclosure can form glasses with the frame glasses shown in FIG. 1. FIG. 1 is a schematic diagram of glasses frame.

It should be understood that FIG. 1 merely provides an example of a scenario in which the optical defocus lens provided in an embodiment of the disclosure can be applied, which does not constitute any limitation on the protection scope of this disclosure.

For example, the optical defocus lens according to an embodiment of the disclosure can be further applied to a virtual reality (VR) lens, an augmented reality (AR) lens, or a contact lens.

In an embodiment, the optical defocus lens according to an embodiment of the disclosure can be used for myopia prevention and control, and is used as a type of myopia prevention and control lens.

In an embodiment, the optical defocus lens according to an embodiment of the disclosure can be used for hyperopia prevention and control, and is used as a type of hyperopia prevention and control lens.

In an embodiment, the optical defocus lens according to an embodiment of the disclosure can be used as a type of presbyopic lens.

Due to the high rate of myopia in adolescents and children, and the degree of myopia changes rapidly, currently, an optical defocus lens is mainly used in the myopia prevention and control field. For ease of description, the following embodiments of this disclosure mainly describe use of the optical defocus lens as a myopia prevention and control lens. When the optical defocus lens is used as a hyperopia prevention and control lens or a presbyopic lens, refer to descriptions of the myopia prevention and control lens. Details are not described in this disclosure.

To facilitate understanding of embodiments of this disclosure, several basic concepts used in embodiments of this disclosure are first briefly described. It should be understood that the basic concepts described below are briefly described by using an example recorded in a current related technology. A name is not limited in this disclosure.

1. Myopia

Figure 2:
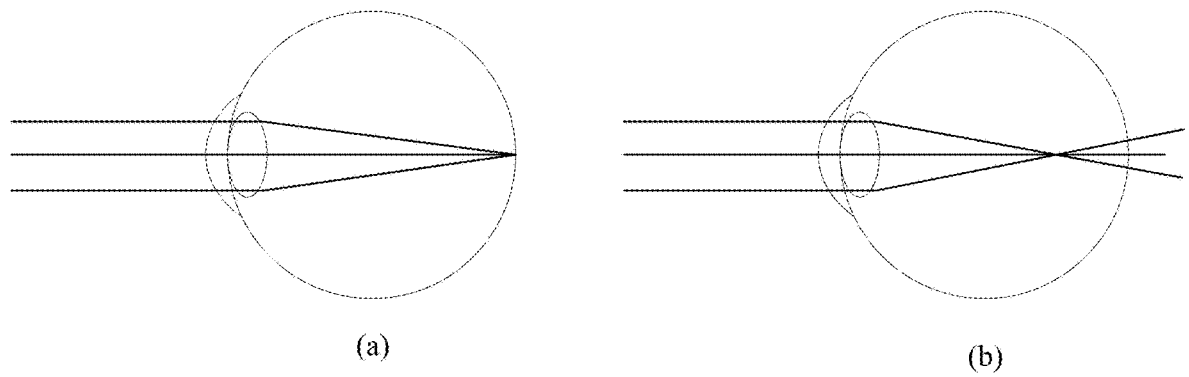

Myopia (or referred to as myopia, near-sightedness, or short-sightedness) is an eye disease in which an image cannot be formed on a retina but in front of the retina when an eye looks at a distant object, resulting in a blurred image. It is generally considered that the cause of myopia is that a lens or a cornea is excessively thick, or the eye axis is excessively long, as shown in FIG. 2. (a) and (b) in FIG. 2 are schematic diagrams of a myopia principle.

(a) in FIG. 2 is a schematic diagram of imaging when a healthy eye (non-myopia eye) looks at a distant object. It can be learned from (a) in FIG. 2 that when a non-myopia eye looks at a distant object, an image may be formed on a retina.

(b) in FIG. 2 is a schematic diagram of imaging when a distant object is viewed with a near-sighted eye. It can be learned from (b) in FIG. 2 that when a distant object is viewed with a near-sighted eye, an image cannot be formed on a retina but in front of the retina.

Figure 3:
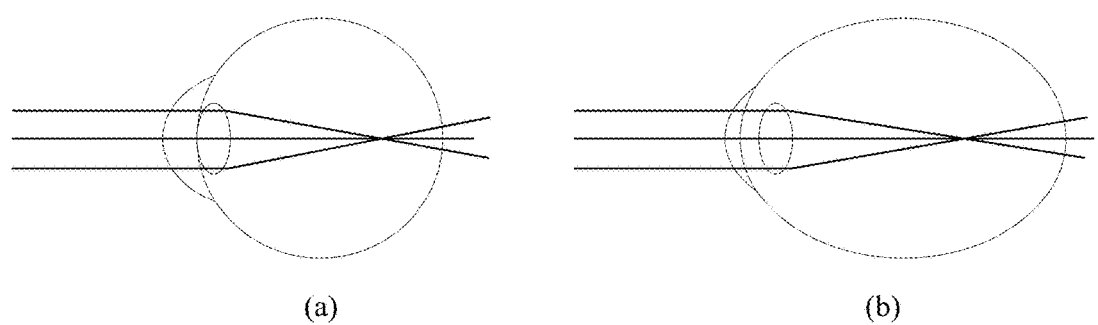

Further, myopia is further divided into refractive myopia and axial myopia. In an embodiment, myopia caused by excessively strong refraction of the lens or the cornea is referred to as refractive myopia; and myopia caused by excessively long eye axis is referred to as axial myopia. As shown in FIG. 3, (a) and (b) in FIG. 3 are schematic diagrams of imaging of different myopia types.

(a) in FIG. 3 is a schematic diagram of imaging of refractive myopia; and (b) in FIG. 3 is a schematic diagram of imaging of axial myopia.

2. Optical Defocus Lens

The optical defocus lens, also referred to as a multi-focal lens, enables two or more different image surfaces to be generated in an eye based on a geometric optical design.

3. Liquid Crystal

After some substances are molten or dissolved in a solvent, the substances lose the rigidity of a solid substance, but obtain fluidity of liquid, and retain the anisotropic ordered arrangement of some crystalline substance molecules, forming an intermediate state with some properties of both crystals and liquid. This oriented ordered fluid that exists in the process of conversion from solid to liquid is called liquid crystal. The definition is broadened to include substances that can be liquid crystals in a temperature range and normally crystallized at lower temperatures.

For example, liquid crystal can flow like liquid (fluidity), but molecules of the liquid crystal are oriented and ordered like a road (anisotropy). There are many different types of liquid crystal phases, which can be distinguished by different optical properties (such as birefringence) of the liquid crystal phases. When viewed under a microscope by using a polarized light source, different liquid crystal phases have different textures. Different textures in the texture comparison region correspond to different liquid crystal molecules. However, the molecules are better oriented and ordered. A liquid crystal material may not always be in the liquid crystal phase (just like that water can become ice or water vapor).

4. Alignment Layer

The front and rear (or upper and lower) layers of glass of the liquid crystal layer are mainly used to clamp the liquid crystal. However, the two pieces of glass are not smooth on a side that is in contact with the liquid crystal, but have a saw-toothed groove. A main purpose of the groove is to arrange linear liquid crystal molecules along the groove, so that the liquid crystal molecules are arranged neatly. Because if the plane is smooth, liquid crystal molecules will not be neatly arranged, resulting in light scattering and light leakage. In an actual manufacturing process, the glass cannot be distributed in such a groove shape. Generally, a layer of polyimide (pI) is coated on the surface of the glass, and then a cloth is used to rub the surface of the glass, so that molecules on the surface of the pI are no longer distributed in a stray manner and are arranged in a fixed and even direction. The pI layer is referred to an alignment layer, which functions like a glass groove, and provides an interface condition for evenly arranging liquid crystal molecules, so that the liquid crystals are arranged in a predetermined sequence.

5. Focal Power

The focal power represents the deflection capability of an incident light. The focal power in this disclosure mainly indicates a deflection capability of liquid crystal molecules in the liquid crystal lens layer to an incident light, or indicates a deflection capability of liquid crystal molecules in a liquid crystal lens region to an incident light.

Currently, two types of common optical defocus lenses include an annular focal point lens and a micro lens. A design of the annular focal point optical defocus lens is shown in FIG. 4, and a design of the micro lens optical defocus lens is shown in FIG. 5.

Figure 4:
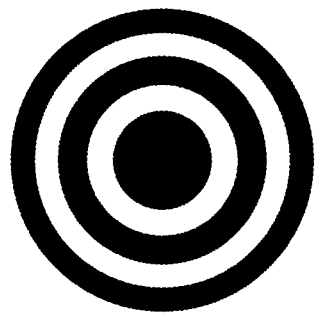
FIG. 4 is a schematic diagram of an optical defocus lens.

FIG. 4 is a schematic diagram of an optical defocus lens. It can be learned from FIG. 4 that the lens is divided into a plurality of concentric annular regions, two groups of regions are alternately arranged (a black region and a white region), and different surface radians of the two groups of regions follow different curvature changes, so that the black concentric annular region and the white concentric annular region have different focal lengths.

Figure 5:
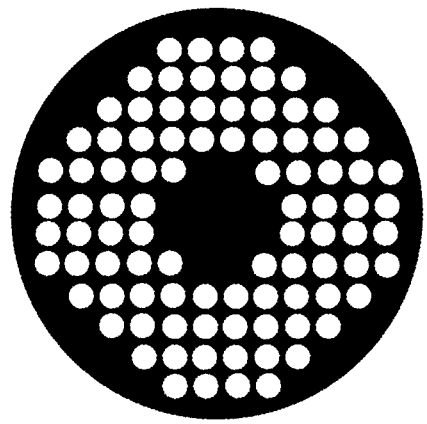
FIG. 5 is a schematic diagram of another optical defocus lens.

FIG. 5 is a schematic diagram of another optical defocus lens. It can be learned from FIG. 5 that the lens is divided into a plurality of circular regions (for example, a white region shown in FIG. 5), and different surface radians of the circular region and other regions of the lens follow different curvature changes, so that the black region and the white region have different focal lengths.

Figure 6:
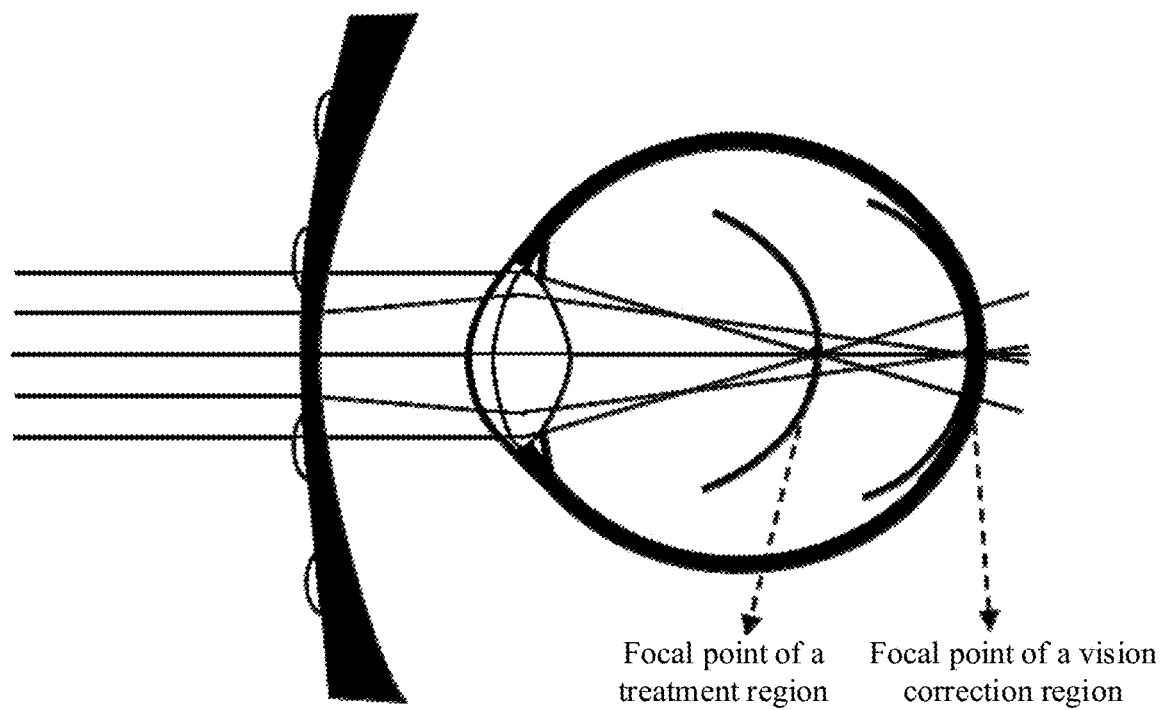
FIG. 6 is a schematic diagram of a myopia prevention and control principle of an optical defocus lens.

A myopia prevention and control principle of an optical defocus lens is shown in FIG. 6. FIG. 6 is a schematic diagram of the myopia prevention and control principle of the optical defocus lens.

It can be learned from FIG. 6 that an imaging surface of a myopia correction region (a focal point of a myopia correction region shown in FIG. 6) of the lens falls on the retina, to ensure that the eyeglasses can see an object clearly; and an imaging surface of a treatment region (a focal point of the treatment region shown in FIG. 6) of the lens falls in front of the retina, to effectively delay an increase of a refraction degree of an eye and an increase of an eye axis length, thereby achieving a myopia prevention and control effect. A distance between the focal point of the myopia correction region and the focal point of the treatment region is referred to as an optical defocus amount.

It can be learned from the foregoing current optical defocus lens that, the current optical defocus lens cannot dynamically adjust an optical defocus amount or disable an optical defocus function. This causes the following problems:

1. Different individuals require different optical defocus amounts for myopia prevention and control. Conventional technologies can only resolve this problem through customization, and therefore a processing period will be very long, and costs will be very high.

2. For different eye distances, the optimal optical defocus amounts required for myopia prevention and control are different. Conventional technologies can only select a fixed optical defocus amount, which affects the myopia prevention and control effect to some extent.

3. Although the optical defocus function can prevent and control myopia, an image seen by human eyes will be blurred to some extent due to existence of two or more focal points. In a scenario in which an object needs to be clearly seen without an optical defocus function, the foregoing optical defocus lens cannot achieve the purpose.

To avoid a problem caused by the foregoing optical defocus lens, this disclosure provides an optical defocus lens and a method for implementing optical defocus, to dynamically adjust an optical defocus amount or disable an optical defocus function by dynamically controlling a voltage of an electrode layer of a liquid crystal layer.

With reference to the accompanying drawings, the following describes in detail the optical defocus lens and the method for implementing optical defocus provided in embodiments of this disclosure.

In addition, to facilitate understanding of embodiments of this disclosure, the following descriptions are provided.

The first, the second, and various numbers (for example, "#1" and "#2") shown in this disclosure are merely for ease of description, and are used for distinguishing objects, but are not intended to limit the scope of embodiments of this disclosure. It should be understood that the objects described such a way are interchangeable in a proper circumstance, so that a solution other than embodiments of this disclosure can be described.

A structure of an execution body of a method provided in embodiments of this disclosure is not limited in the following embodiments, provided that a program that records code for the method provided in embodiments of this disclosure can be run to adjust optical defocus of the optical defocus lens according to the method provided in embodiments of this disclosure. For example, the method provided in embodiments of this disclosure may be performed by an optical defocus lens, or a functional module that is in the optical defocus lens and that can invoke and execute a program.

For example, this disclosure proposes an optical defocus lens. The optical defocus lens includes:

a first lens layer and at least one liquid crystal lens layer.

For example, the first lens layer in an embodiment of the disclosure is a conventional lens layer currently used in glasses, and may be a concave lens, a convex lens, or a plano lens.

For example, the first lens layer may further has an astigmatism degree as required.

A refractive index of liquid crystal molecules in each of the at least one liquid crystal lens layer is controlled by an electric field, to converge or diverge polarized light that is incident to a direction of each liquid crystal lens layer to form a focal point.

The optical defocus lens implements optical defocus in the following two manners:

Manner 1: A first liquid crystal lens layer in at least one liquid crystal lens layer is configured to converge or diverge polarized light in a first direction to form a first focal point, and the first lens layer is configured to converge or diverge polarized light in a second direction to form a second focal point, where the second direction is different from the first direction, and positions of the first focal point and the second focal point are different.

The case shown in Manner 1 may be understood as follows: The foregoing at least one liquid crystal lens layer is one layer, and can converge or diverge polarized light in only one direction to form a focal point; and the first lens layer converges or diverges polarized light in a direction to form a focal point.

Manner 2: A first liquid crystal lens layer in at least one liquid crystal lens layer is configured to converge or diverge polarized light in a first direction to form a first focal point, and a second liquid crystal lens layer in the at least one liquid crystal lens layer is configured to converge or diverge polarized light in a second direction to form a second focal point, where the second liquid crystal lens layer is different from the first liquid crystal lens layer, the second direction is different from the first direction, and positions of the first focal point and the second focal point are different.

The case shown in Manner 2 may be understood as follows: The at least one liquid crystal lens layer is a plurality of layers (at least two liquid crystal lens layers), and can converge or diverge polarized light that is incident to the optical defocus lens in two directions to form a plurality of focal points.

The case shown in Manner 2 may also be understood as follows: The foregoing at least one liquid crystal lens layer is a plurality of layers, and can separately converge or diverge polarized light in a plurality of directions to form a plurality of focal points; and the first lens layer converges or diverges polarized light in a direction to form a focal point. For example, the first liquid crystal lens layer is configured to converge or diverge polarized light in a first direction to form a first focal point; the second liquid crystal lens layer is configured to converge or diverge polarized light in a second direction to form a second focal point; and the first lens layer is configured to converge or diverge polarized light in a third direction to form a third focal point, and a position of the third focal point is different from a position of the first focal point or a position of the second focal point.

It should be understood that, in the case shown in Manner 2, the optical defocus lens in an embodiment of the disclosure can also implement optical defocus without including the foregoing first lens layer.

It should be noted that the liquid crystal lens layer functions on polarized light in a direction parallel to the alignment layer of the liquid crystal lens layer. That the first liquid crystal lens layer is configured to converge or diverge polarized light in the first direction to form a first focal point may be understood as: The first liquid crystal lens layer is configured to converge or diverge components that are in the first direction and that are of the polarized light having components in the first direction, to form the first focal point; and that the second liquid crystal lens layer is configured to converge or diverge the polarized light in the second direction to form a second focal point may be understood as follows: The second liquid crystal lens layer is configured to converge or diverge that are in the second direction and that are of the polarized light having components in the second direction, to form the second focal point.

It should be understood that, in an embodiment of the disclosure, a principle that the liquid crystal lens layer can function to converge or diverge polarized light in a direction to form a focal point is not described excessively much. For details, refer to records in a current related technology.

It should be noted that an electric field that controls a refractive index of liquid crystal molecules in the liquid crystal lens layer is controlled by a power supply and a voltage control circuit.

It should be understood that a design of the voltage control circuit is not limited in an embodiment of the disclosure, and reference may be made to descriptions in a current related technology, for example, a design of a current voltage division circuit.

For example, for how the voltage control circuit and the power supply generate a plurality of voltages, refer to descriptions in a current related technology. This is not limited in this disclosure.

In addition, the voltage control circuit and the power supply may be integrated on the optical defocus lens, or may be disposed on a lens frame of the glasses, or may be connected to the glasses as a peripheral.

In an embodiment, the power supply and voltage control circuit are a part of the foregoing optical defocus lens.

For example, the power supply and the voltage control circuit may be integrated in a position that is of a contact lens and that does not cover a pupil.

In an embodiment, the power supply and voltage control circuit are disposed on a glasses frame and/or a glasses leg.

For example, the power supply and the voltage control circuit are disposed on a glasses frame of frame glasses. For another example, the power supply and the voltage control circuit are disposed on a glasses frame of AR or VR glasses.

Figure 7:
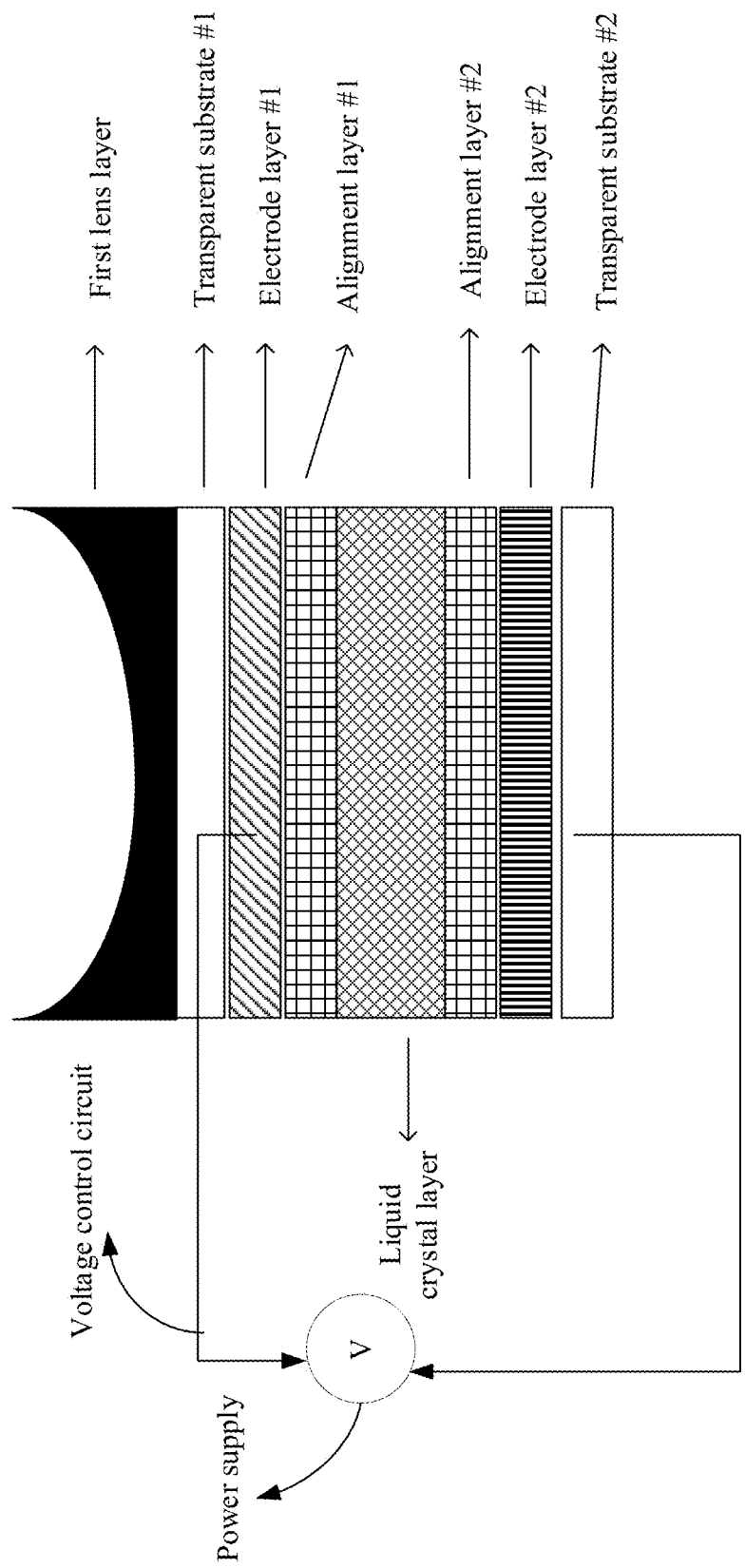
FIG. 7 is a schematic diagram of an optical defocus lens according to an embodiment of this disclosure;
(a) to (d) in FIG. 8 are schematic diagrams of region distribution of a liquid crystal lens layer according to an embodiment of this disclosure.

For ease of description, with reference to FIG. 7, an example in which an optical defocus lens includes a first lens layer, a liquid crystal lens layer, a power supply circuit, and a voltage control circuit is used for description. FIG. 7 is a schematic diagram of an optical defocus lens according to an embodiment of this disclosure.

It should be understood that FIG. 7 merely describes a possible structure of the optical defocus lens by using an example, and does not constitute any limitation on the protection scope of this disclosure. For example, the optical defocus lens may include a plurality of liquid crystal lens layers, or the optical defocus lens may include a plurality of first lens layers, or the optical defocus lens may not include the power supply and the voltage control circuit.

For example, the liquid crystal lens layer in an embodiment of the disclosure includes two transparent substrates (a transparent substrate #1 and a transparent substrate #2 shown in FIG. 7), two alignment layers (an alignment layer #1 and an alignment layer #2 shown in FIG. 7), two electrode layers (an electrode layer #1 and an electrode layer #2 shown in FIG. 7), and a liquid crystal layer. The liquid crystal layer is located between the two alignment layers, and the two electrode layers are respectively located on a side that is of the two alignment layers and that is away from the liquid crystal layer (as shown in FIG. 7, the electrode layer #1 is disposed on an upper side of the alignment layer #1, and the electrode layer #2 is disposed on a lower side of the alignment layer #2). The two layers of transparent substrates are respectively located on a side that is of the two electrode layers and that is away from the liquid crystal layer (as shown in FIG. 7, the transparent substrate #1 is disposed on an upper side of the electrode layer #1, and the transparent substrate #2 is disposed on a lower side of the electrode layer #2).

Alternatively, it may be described as follows: The liquid crystal lens layer sequentially includes the transparent substrate #1, the electrode layer #1, the alignment layer #1, the liquid crystal layer, the alignment layer #2, the electrode layer #2, and the transparent substrate #2 from top to bottom (or from left to right, from right to left, or from bottom to top).

It should be understood that the foregoing structure of the liquid crystal lens layer is merely an example, and does not constitute any limitation on the protection scope of this disclosure. The structure of the liquid crystal lens layer is not limited in an embodiment of the disclosure, provided that the liquid crystal lens layer can converge or diverge polarized light in a direction to form at least one focal point, and a position of the at least one focal point may change with a voltage applied to an electrode layer of the liquid crystal lens layer. Another possible structure of the liquid crystal lens layer also falls within the protection scope of this disclosure.

For example, there may be one or no transparent substrate of the liquid crystal lens layer. For another example, a position of the transparent substrate in each layer shown in FIG. 7 may be interchanged with a position of the electrode layer. For another example, there may be one or more alignment layers. Examples are not described herein one by one. Any structure that is of the liquid crystal lens layer and that can implement a function of the liquid crystal lens layer in an embodiment of the disclosure may be used.

For ease of description, the following uses an example in which a structure of the liquid crystal lens layer is the structure shown in FIG. 7 for description. However, it should be understood that the structure is merely an example, and does not constitute any limitation on the protection scope of this disclosure.

For example, one of the two electrode layers is a flat electrode, and the other electrode layer includes a plurality of annular electrodes (as shown in FIG. 7, the electrode layer #1 is a flat electrode, and the electrode layer #2 includes a plurality of annular electrodes. FIG. 7 is merely an example; alternatively, the electrode layer #2 may be a flat electrode, and the electrode layer #1 includes a plurality of annular electrodes). The flat electrode indicates that electrodes of the entire electrode layer are the same, and a plurality of different voltages may be applied to the plurality of annular electrodes.

For example, when a plurality of different voltages are applied to a plurality of annular electrodes, there are a plurality of different voltage differences between the two electrode layers.

For example, the electrode layer #1 is a flat electrode, and a voltage is V; and the electrode layer #2 includes three annular electrodes (an annular electrode #1, an annular electrode #2, and an annular electrode #3), and a voltage V #1 is applied to the annular electrode #1, a voltage V #2 is applied to the annular electrode #2, and a voltage V #3 is applied to the annular electrode #3. The voltage differences between the electrode layer #1 and the electrode layer #2 include |V-V #1|, V #2|, and |V-V #3|.

For example, a high-impedance transparent material is filled between the plurality of annular electrodes, for example, filled with zinc oxide or conductive polymer.

In an embodiment, a plurality of electrode lines of the plurality of annular electrodes are directly led out from the electrode layer.

In an embodiment, the plurality of electrode lines of the plurality of annular electrodes are led out through the transparent substrate, so that impact of an electric field generated by the electrode lines on the liquid crystal can be avoided.

For example, the transparent substrate in an embodiment of the disclosure may be a flexible substrate, for example, the transparent substrate is made of at least one of the following materials:

polyethylene terephthalate (PET), polyethylene naphthalate (PEN), polyimide (PI), polydimethyl siloxyane (PDMS), and the like.

In an embodiment, the transparent substrate in an embodiment of the disclosure may be a rigid substrate, for example, the transparent substrate is made of glass.

For example, the electrode layer in an embodiment of the disclosure may be a transparent conducting layer, and may be made of at least one of the following materials:

transparent conductive oxide TCO, conductive polymer, metal nanowire, metal grid, graphene, carbon nanotube, metal or alloy, metal oxide, and the like.

For example, the liquid crystal layer in an embodiment of the disclosure may be prepared by using a liquid crystal layer preparation material recorded in a current related technology.

It should be understood that, in an embodiment of the disclosure, a preparation method and a preparation material of the liquid crystal lens layer, and a structure of the liquid crystal lens layer are not limited. For details, refer to records in a current related technology or a future technology. Details are not described herein.

For example, the liquid crystal lens layer in an embodiment of the disclosure includes at least one liquid crystal lens region, and a refractive index of liquid crystal molecules in each of the at least one liquid crystal lens region is controlled by an electric field, to converge or diverge polarized light that is incident to a direction of each liquid crystal lens region to form a focal point.

Further, the liquid crystal lens layer further includes a non-liquid crystal lens region, and a refractive index of liquid crystal molecules in the non-liquid crystal lens region is not controlled by the electric field.

In an embodiment, when the liquid crystal lens layer includes a plurality of liquid crystal lens regions, refractive index distribution of liquid crystal molecules in at least two of the plurality of liquid crystal lens regions is different. In an embodiment, two liquid crystal lens regions including different refractive index distribution can separately converge or diverge polarized light in a direction to form different focal points.

It may be understood that a liquid crystal deflection angle of a liquid crystal lens region may be controlled by applying a voltage, and a liquid crystal in a non-liquid crystal lens region is not deflected due to an electric field generated by the electrode layer.

The following briefly describes region distribution of the liquid crystal lens layer in an embodiment of the disclosure with reference to FIG. 8. (a) to (d) in FIG. 8 are schematic diagrams of region distribution of the liquid crystal lens layer according to an embodiment of this disclosure.

It can be learned from (a) and (b) in FIG. 8 that there may be one liquid crystal lens region at the liquid crystal lens layer in an embodiment of the disclosure.

It can be learned from (c) and (d) in FIG. 8 that there may be a plurality of liquid crystal lens regions at the liquid crystal lens layer in an embodiment of the disclosure.

In an embodiment, arrangement of liquid crystal lens regions at the liquid crystal lens layer may be controlled by filling a high-resistance material between annular electrodes in the electrode layer, for example, an electric field is generated only in a part filled with the high-resistance material, so as to control liquid crystal molecules. That is, the liquid crystal lens region corresponds to the part filled with the high-resistance material.

In an embodiment, arrangement of liquid crystal lens regions at the liquid crystal lens layer may be controlled by covering a liquid crystal material. For example, the liquid crystal lens region is covered with the liquid crystal material.

In an embodiment, arrangement of liquid crystal lens regions at the liquid crystal lens layer may be implemented through another production process.

It should be understood that FIG. 8 merely shows an example of an arrangement of liquid crystal lens regions at the liquid crystal lens layer in an embodiment of the disclosure, and does not constitute any limitation on the protection scope of this disclosure. In an embodiment of the disclosure, no limitation is imposed on an arrangement of liquid crystal lens regions at the liquid crystal lens layer, and the liquid crystal lens layer includes one or more liquid crystal lens regions.

For example, in an embodiment of the disclosure, that the voltage control circuit and the power supply control the electric field generated by the two electrode layers of the liquid crystal lens layer, to implement optical defocus includes the following several possibilities:

Possibility 1: The power supply and the voltage control circuit are configured to control an electric field generated by two electrode layers of each of the plurality of liquid crystal lens layers, so that the plurality of liquid crystal lens layers converge or diverge polarized light in a plurality of directions to form a plurality of different focal points. For example, alignment directions of at least two liquid crystal lens layers in the plurality of liquid crystal lens layers are different.

Figure 9:
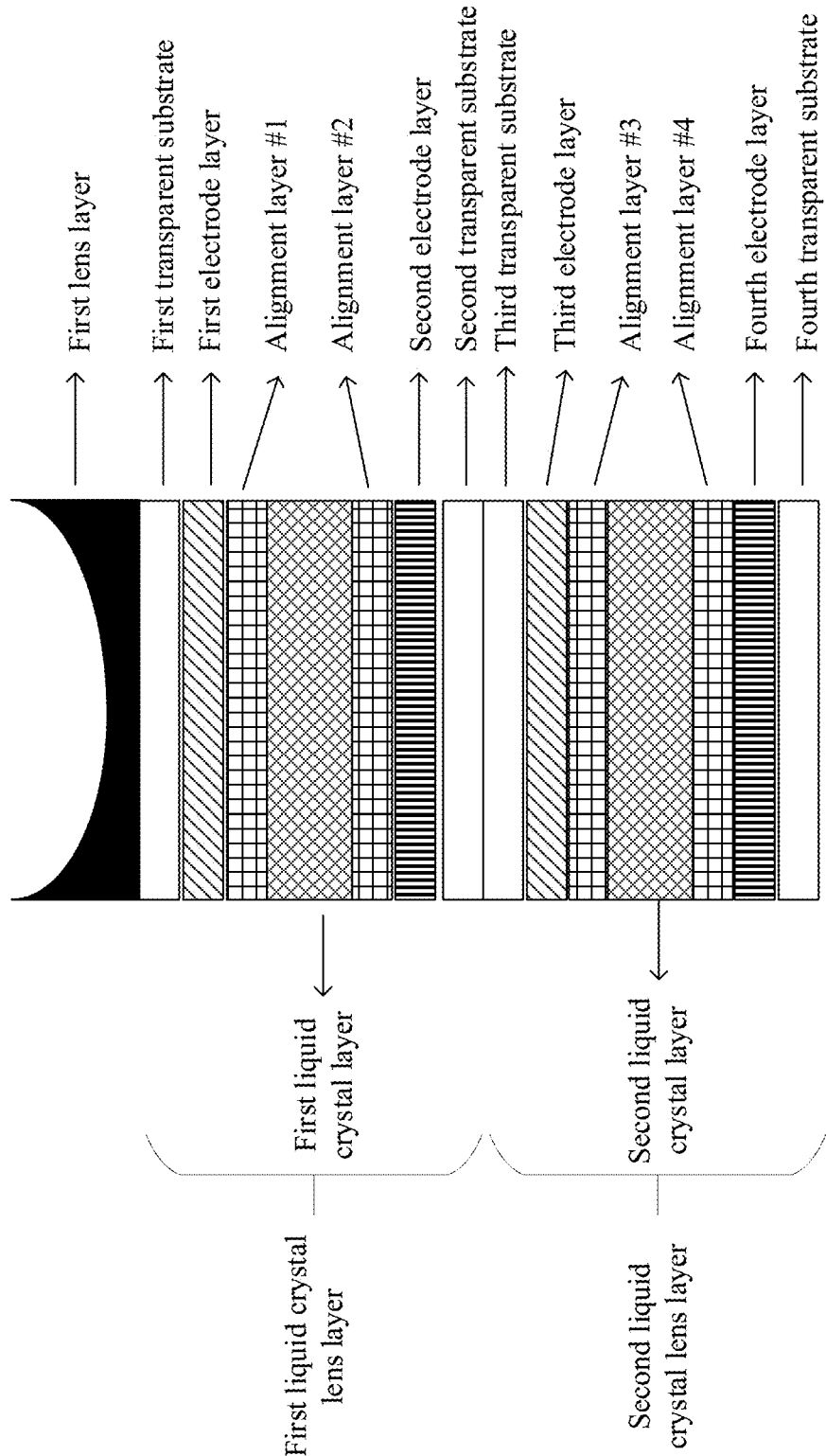
FIG. 9 is a schematic diagram of another optical defocus lens according to an embodiment of this disclosure.
Figure 10:
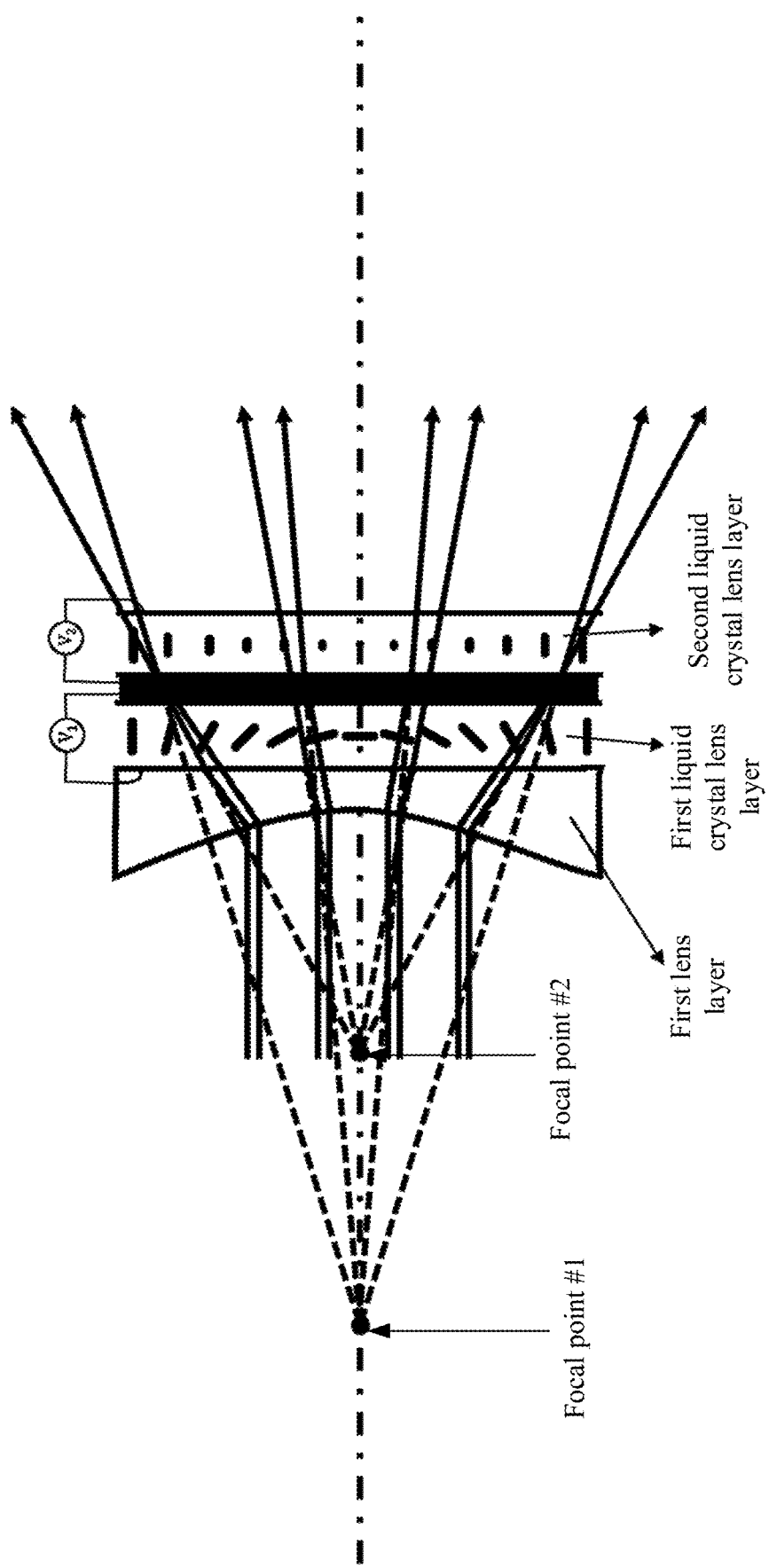
FIG. 10 is a schematic diagram of optical defocus of an optical defocus lens according to an embodiment of this disclosure.

With reference to FIG. 9 and FIG. 10, the following describes in detail how to implement optical defocus by using the optical defocus lens shown in possibility 1.

FIG. 9 is a schematic diagram of another optical defocus lens according to an embodiment of this disclosure.

It can be learned from FIG. 9 that the optical defocus lens includes a first lens layer, a first liquid crystal lens layer, and a second liquid crystal lens layer.

For example, the first liquid crystal lens layer sequentially includes a first transparent substrate, a first electrode layer, an alignment layer #1, a first liquid crystal layer, an alignment layer #2, a second electrode layer, and a second transparent substrate.

For example, the second liquid crystal lens layer sequentially includes a third transparent substrate, a third electrode layer, an alignment layer #3, a second liquid crystal layer, an alignment layer #4, a fourth electrode layer, and a fourth transparent substrate.

For example, the alignment layer #1 and the alignment layer #2 are collectively referred to as a first alignment layer, and the alignment layer #3 and the alignment layer #4 are collectively referred to as a second alignment layer. An alignment direction of the first alignment layer is a first direction, an alignment direction of the second alignment layer is a second direction, and the first direction is different from the second direction.

It should be understood that FIG. 9 is merely an example of a schematic diagram of a possible structure of the optical defocus lens in an embodiment of the disclosure, and does not constitute any limitation on the protection scope of this disclosure. For example, the optical defocus lens may not include the first lens layer. For another example, the optical defocus lens may include a plurality of first lens layers. For another example, the optical defocus lens may include at least two liquid crystal lens layers.

For example, a distribution form of the liquid crystal lens regions at the first liquid crystal lens layer and/or the second liquid crystal lens layer in FIG. 9 may be any one shown in FIG. 8, or may be another possible distribution form.

For example, the optical defocus lens shown in FIG. 9 can implement optical defocus. For example, the optical defocus lens or glasses including the optical defocus lens include:

a first power supply and a first voltage control circuit, where the first voltage control circuit and the first power supply are configured to control the first electrode layer and the second electrode layer to generate a first electric field, the first electric field is used to rotate liquid crystal molecules in at least one liquid crystal lens region at the first liquid crystal layer, and the rotated liquid crystal molecules are used to converge or diverge polarized light in a first direction to form at least one first focal point; and a second power supply and a second voltage control circuit, where the second voltage control circuit and the second power supply are configured to control the third electrode layer and the fourth electrode layer to generate a second electric field, the second electric field is used to rotate liquid crystal molecules in at least one liquid crystal lens region at the second liquid crystal layer, and the rotated liquid crystal molecules are used to converge or diverge polarized light in a second direction to form at least one second focal point.

The second direction is different from the first direction, and positions of the first focal point and the second focal point are different.

For example, the first power supply and the second power supply may be one power supply, and/or the first voltage control circuit and the second voltage control circuit may also be one voltage control circuit.

The two liquid crystal layers function only on polarized light in directions parallel to alignment directions of the alignment layers of the two liquid crystal layers. When the directions of the alignment layers of the two liquid crystal layers are different, the two liquid crystal layers may function on polarized light in different polarization directions.

In an embodiment, when the alignment directions of the alignment layers of the two liquid crystal layers are orthogonal, and each of the two liquid crystal lens layers includes one liquid crystal lens region (for example, arrangement of the liquid crystal lens regions is that shown in (a) or (d) in FIG. 8), the two liquid crystal layers may have different divergence (or convergence) effects on polarized light in two orthogonal directions, to generate two different focal points.

In an embodiment, when the alignment directions of the alignment layers of the two liquid crystal layers are orthogonal, there are a plurality of liquid crystal lens regions at each of the two liquid crystal lens layers (for example, the arrangement of the liquid crystal lens regions is that shown in (c) or (d) in FIG. 8), and refractive index distribution of liquid crystal molecules in different liquid crystal lens regions is the same, the two liquid crystal layers may have different divergence (or convergence) effects on polarized light in two orthogonal directions, to generate two different focal points.

In an embodiment, when the alignment layers of the two liquid crystal layers have different alignment directions that are not orthogonal, the two liquid crystal layers may have different divergence (or convergence) effects on polarized light in two different directions, to generate two different focal points. In an embodiment, because the alignment directions of the alignment layers of the two liquid crystal layers are not orthogonal, the first lens layer diverges (or converges) polarized light in a direction to generate a focal point.

In an embodiment, when there are a plurality of liquid crystal lens regions at at least one of the two liquid crystal lens layers (for example, arrangement of the liquid crystal lens regions is that shown in (c) or (d) in FIG. 8), and refractive index distribution of liquid crystal molecules in different liquid crystal lens regions is different (for example, different liquid crystal lens regions are controlled by using different electric fields, or different liquid crystal lens regions are made of different liquid crystal materials), the two liquid crystal lens layers may generate more than two different focal points.

For ease of description, the following briefly describes optical defocus of the optical defocus lens shown in FIG. 9 by using an example in which the alignment directions corresponding to the first liquid crystal lens layer and the second liquid crystal lens layer are orthogonal, and the arrangement of the liquid crystal lens regions at the first liquid crystal lens layer and the second liquid crystal lens layer is that shown in (a) in FIG. 8. FIG. 10 is a schematic diagram of optical defocus of an optical defocus lens according to an embodiment of this disclosure.

As shown in FIG. 10, the lens has different divergence (convergence) effects on polarized light (two parallel lines shown in FIG. 10) in two orthogonal directions, to generate two different focal points. In this case, the lens is an optical defocus lens.

It can be learned from FIG. 10 that, the two focal points (a focal point #1 and a focal point #2 shown in FIG. 10) are generated by divergence (or convergence) of polarized light in two directions that are orthogonal to each other and that is of each of the first liquid crystal lens layer and the second liquid crystal lens layer. That is, in the case shown in FIG. 10, the optical defocus lens can also implement an optical defocus function without the first lens layer.

In addition, it should be noted that there is a support between the plurality of liquid crystal lens layers (for example, between the first liquid crystal lens layer and the second liquid crystal lens layer). A structure and a material of the support may be a transparent substrate or another transparent material. This is not limited in this disclosure.

Further, by dynamically controlling the electric field applied to the two liquid crystal lens layers, both the overall focal power and the optical defocus amount of the lens may be dynamically adjusted. For example, a voltage value corresponding to a voltage that generates an electric field is adjusted; and for another example, a position of an annular electrode is adjusted.

In addition, no electric field may be applied (for example, the voltage value corresponding to the voltage that generates the electric field is 0), so that the liquid crystal lens layer does not converge or diverge the polarized light to form a focal point. For example, electric fields applied to the first liquid crystal lens layer and the second liquid crystal lens layer shown in FIG. 9 are controlled, so that neither the first liquid crystal lens layer nor the second liquid crystal lens layer converges or diverges polarized light to form a focal point, and a defocus function of the lens is disabled.

For example, electric field distribution formed by the two electrode layers enables liquid crystal molecules in different positions at the liquid crystal layer to rotate to different degrees in a direction of the electric field, so that the liquid crystal layer forms gradient refractive index distribution for polarized light in one direction. The refractive index distribution complies with parabolic distribution or Fresnel distribution (as shown in FIG. 10, liquid crystal molecules at the first liquid crystal lens layer rotate at different angles, liquid crystal molecules in a middle position rotate at a large angle, and liquid crystal molecules on two sides rotate at a small angle).

It should be understood that FIG. 10 merely shows an example implementation of optical defocus by the optical defocus lens shown in FIG. 9, and does not constitute any limitation on the protection scope of this disclosure. For example, when the optical defocus lens shown in FIG. 9 includes more than two liquid crystal lens layers, the schematic diagram of the optical defocus shown in FIG. 10 may show more than two focal points. For another example, when the optical defocus lens shown in FIG. 9 includes a plurality of liquid crystal lens regions at the liquid crystal lens layer, the schematic diagram of the optical defocus shown in FIG. 10 may show more than two focal points.

Possibility 2: The power supply and the voltage control circuit are configured to control an electric field generated by two electrode layers of one liquid crystal lens layer, so that the liquid crystal lens layer converges or diverges polarized light in a direction to form a focal point.

Figure 11:
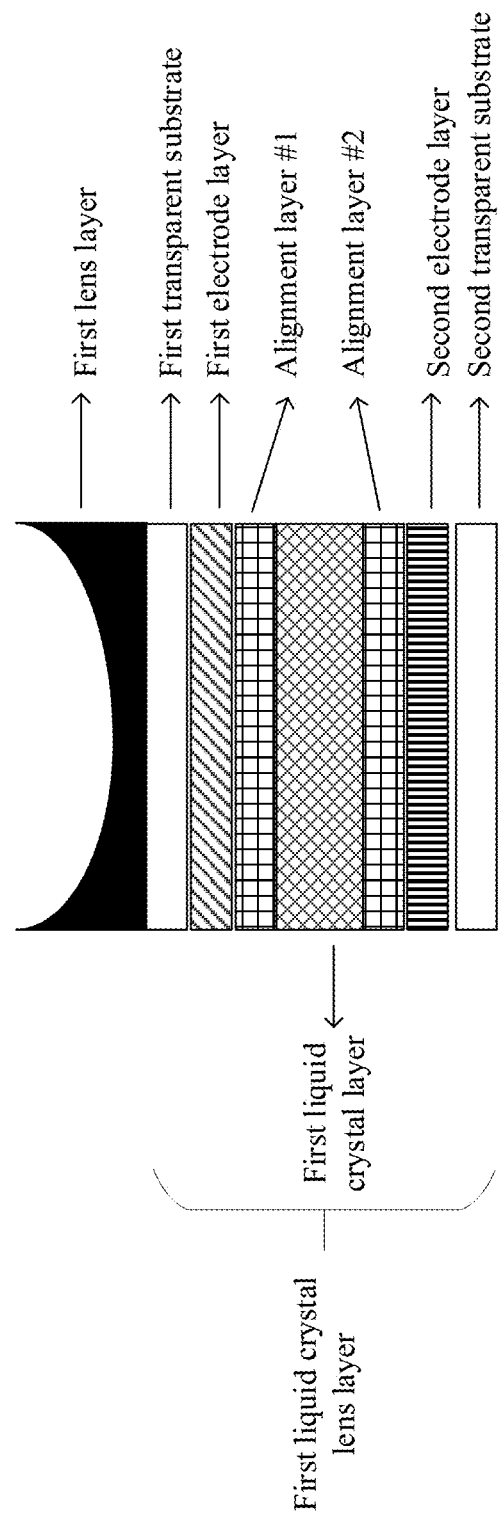
FIG. 11 is a schematic diagram of still another optical defocus lens according to an embodiment of this disclosure.

With reference to FIG. 11 and FIG. 12, the following describes in detail how to implement optical defocus by using the optical defocus lens shown in possibility 2.

FIG. 11 is a schematic diagram of still another optical defocus lens according to an embodiment of this disclosure.

It can be learned from FIG. 11 that the optical defocus lens includes a first lens layer and a first liquid crystal lens layer.

For example, the first liquid crystal lens layer sequentially includes a first transparent substrate, a first electrode layer, an alignment layer #1, a first liquid crystal layer, an alignment layer #2, a second electrode layer, and a second transparent substrate.

It should be understood that FIG. 11 is merely an example of a schematic diagram of a possible structure of the optical defocus lens in an embodiment of the disclosure, and does not constitute any limitation on the protection scope of this disclosure. For example, the optical defocus lens may include a plurality of first lens layers. For another example, the liquid crystal lens layer may include at least two liquid crystal lens regions.

For the first lens layer shown in FIG. 11, refer to the foregoing description of the first lens layer in FIG. 9. Details are not described herein again.

For example, a distribution form of the liquid crystal lens regions at the first liquid crystal lens layer in FIG. 11 may be any one shown in FIG. 8, or may be another possible distribution form.

For example, the optical defocus lens shown in FIG. 11 can implement optical defocus. For example, the voltage control circuit and the power supply are configured to control the first electrode layer and the second electrode layer of the first liquid crystal lens layer to generate a first electric field that is used to rotate liquid crystal molecules in at least one liquid crystal lens region at the first liquid crystal lens layer, and the rotated liquid crystal molecules are used to converge or diverge in a second direction to form at least one first focal point.

It should be understood that the liquid crystal lens layer included in the optical defocus lens in possibility 2 includes only the first liquid crystal lens layer, and the first liquid crystal lens layer can process polarized light in only a direction (a direction parallel to the alignment direction of the first liquid crystal lens layer).

The first lens layer included in the optical defocus lens converges or diverges polarized light that is not converged or divergent at the first liquid crystal lens layer, to form a second focal point.

In an embodiment, when the first liquid crystal lens layer includes one liquid crystal lens region (for example, arrangement of the liquid crystal lens regions is that shown in (a) or (b) in FIG. 8), the liquid crystal lens region at the first liquid crystal lens layer may diverge (or converge) polarized light in a second direction, to generate a first focal point. The first lens layer converges or diverges polarized light that is not converged or divergent at the first liquid crystal lens layer, to form a second focal point. In this way, optical defocus is implemented.

In an embodiment, when the first liquid crystal lens layer includes a plurality of liquid crystal lens regions (for example, arrangement of the liquid crystal lens regions is that shown in (c) or (d) in FIG. 8), different liquid crystal lens regions at the first liquid crystal lens layer may have different divergence (or convergence) effects on polarized light in the second direction. In this way, a plurality of first focal points are generated (for example, different liquid crystal lens regions are controlled by using different electric fields, or different liquid crystal lens regions are made of different liquid crystal materials). The first lens layer converges or diverges polarized light that is not converged or divergent at the first liquid crystal lens layer, to form a second focal point. In this way, optical defocus is implemented.

For ease of description, the following briefly describes optical defocus of the optical defocus lens shown in FIG. 11 by using an example in which the arrangement of liquid crystal lens regions at the first liquid crystal lens layer is shown in (a) in FIG. 8. FIG. 12 is a schematic diagram of optical defocus of another optical defocus lens according to an embodiment of this disclosure.

The liquid crystal lens region at the first liquid crystal lens layer and the conventional lens layer respectively generate different divergence effects on polarized light in two directions (two parallel lines shown in FIG. 12) that are orthogonal to the polarization direction, so as to generate two different focal points. In this case, the lens is an optical defocus lens.

Further, by dynamically controlling the electric field applied to the liquid crystal lens layer, the optical defocus amount of the lens may be dynamically adjusted. For example, a position of a focal point formed by the liquid crystal lens layer is adjusted by dynamically controlling an electric field applied to the liquid crystal lens layer.

In addition, no electric field may be applied (for example, the voltage value corresponding to the voltage that generates the electric field is 0), so that the liquid crystal lens layer does not converge or diverge the polarized light to form a focal point. For example, an electric field applied to the first liquid crystal lens layer shown in FIG. 11 is controlled, so that the first liquid crystal lens layer does not converge or diverge polarized light to form a focal point, and the defocus function of the lens is disabled.

It should be understood that FIG. 12 merely shows an example implementation of optical defocus by the optical defocus lens shown in FIG. 11, and does not constitute any limitation on the protection scope of this disclosure. For example, when there are more than two liquid crystal lens regions at the liquid crystal lens layer included in the optical defocus lens shown in FIG. 11, and refractive indexes of liquid crystal molecules in different liquid crystal lens regions are controlled by an electric field, is configured to converge or diverge polarized light incident to a direction into the liquid crystal lens region to form different focal points, more than two focal points may be shown in the schematic diagram of optical defocus shown in FIG. 12.

An embodiment of this disclosure further provides a method for implementing optical defocus. The method for implementing optical defocus may be implemented by an optical defocus lens, and is applied to the foregoing optical defocus lens. The following describes in detail the method for implementing optical defocus with reference to FIG. 13. FIG. 13 is a schematic flowchart of a method for implementing optical defocus according to an embodiment of the disclosure. The method includes the following operations.

S1310: A first liquid crystal lens layer in at least one liquid crystal lens layer converges or diverges polarized light in a first direction under control of a first electric field to form a first focal point.

S1320: The first lens layer converges or diverges polarized light in a second direction to form a second focal point, or a second liquid crystal lens layer in the at least one liquid crystal lens layer converges or diverges the polarized light in the second direction under control of a second electric field to form the second focal point.

The second liquid crystal lens layer is different from the first liquid crystal lens layer, the second direction is different from the first direction, and positions of the first focal point and the second focal point are different.

For example, when the optical defocus lens includes the first lens layer, the first liquid crystal lens layer, and the second liquid crystal lens layer, the first liquid crystal lens layer converges or diverges the polarized light in the first direction under control of the first electric field to form the first focal point; the second liquid crystal lens layer converges or diverges the polarized light in the second direction under control of the second electric field to form the second focal point; and the first lens layer converges or diverges polarized light in a third direction to form a third focal point, where a position of the third focal point is different from a position of the first focal point or a position of the second focal point.

An electric field that controls a refractive index of liquid crystal molecules in the liquid crystal lens layer is controlled by a power supply and a voltage control circuit. That is, the method for implementing optical defocus further includes: generating an electric field based on the power supply and the voltage control circuit.

For example, the voltage control circuit and the power supply generate a plurality of voltages whose voltage values are not 0, and apply the plurality of voltages to two electrode layers of the liquid crystal lens layer.

For ease of description, an example in which a structure of the liquid crystal lens layer is that shown in FIG. 7 is used for description.

Possibility 1: The plurality of voltages are applied to two electrode layers of each of the plurality of liquid crystal lens layers, so that the plurality of liquid crystal lens layers converge or diverge polarized light in a plurality of directions to form a plurality of different focal points.

For example, a structure of the optical defocus lens includes a first lens layer, a first liquid crystal lens layer, and a second liquid crystal lens layer. A part of voltages of the plurality of voltages are applied to the electrode layer of the first liquid crystal lens layer, so that the first liquid crystal lens layer converges or diverges polarized light in a first direction to form at least one first focal point; and a part of the plurality of voltages are applied to the electrode layer of the second liquid crystal lens layer, so that the second liquid crystal lens layer converges or diverges polarized light in a second direction to form at least one second focal point.

In possibility 1, as shown in FIG. 9, the second electrode layer includes N annular electrodes (or the first electrode layer includes N annular electrodes), and the fourth electrode layer includes M annular electrodes (or the third electrode layer includes M annular electrodes), where N and M are integers greater than 1.

P voltages are generated by using the voltage control circuit and the power supply, where P is an integer greater than or equal to N and M.

N voltages that are in the P voltages and that are not exactly the same are applied to the first electrode layer or the second electrode layer to form a first electric field, where the first electric field is used to rotate liquid crystal molecules in at least one liquid crystal lens region at the first liquid crystal layer, and the rotated liquid crystal molecules are used to converge or diverge polarized light in a first direction to form at least one first focal point.

M voltages that are in the P voltages and that are not exactly the same as the N voltages are applied to the third electrode layer or the fourth electrode layer to form a second electric field, where the second electric field is used to rotate liquid crystal molecules in at least one liquid crystal lens region at the second liquid crystal layer, and the rotated liquid crystal molecules are used to converge or diverge polarized light in a second direction to form at least one third focal point.

Further, magnitudes of the plurality of voltages are adjusted by using the voltage control circuit and the power supply. The overall focal power and optical defocus of the lens can be dynamically adjusted.

In an embodiment, the optical defocus lens includes a first power supply, a first voltage control circuit, a second power supply, and a second voltage control circuit, and that P voltages are generated by using the voltage control circuit and the power supply includes:

generating P1 voltages by using the first power supply and the first voltage control circuit, where P1 is an integer greater than or equal to N; and generating P2 voltages by using the second power supply and the second voltage control circuit, where P2 is an integer greater than or equal to M.

That N voltages that are in the P voltages and that are not exactly the same are applied to the first electrode layer or the second electrode layer to form a first electric field includes: applying the N voltages that are in the P1 voltages and that are not exactly the same to the first electrode layer or the second electrode layer to form the first electric field.

That M voltages that are in the P voltages and that are not exactly the same as the N voltages are applied to the third electrode layer or the fourth electrode layer to form a second electric field: applying the M voltages that are in the P2 voltages and that are not exactly the same as the N voltages to the third electrode layer or the fourth electrode layer to form the second electric field.

Possibility 2: The plurality of voltages are applied to the electric field generated by the two electrode layers of the liquid crystal lens layer, so that the liquid crystal lens layer converges or diverges polarized light in a direction to form at least one focal point.

For example, a structure of the optical defocus lens includes a first lens layer, a first liquid crystal lens layer, and a second liquid crystal lens layer. A part of the plurality of voltages are applied to the electrode layer of the first liquid crystal lens layer, so that the first liquid crystal lens layer converges or diverges polarized light in a first direction to form at least one first focal point.

The first lens layer converges or diverges polarized light in a second direction to form a second focal point. In possibility 2, as shown in FIG. 11, the second electrode layer includes N annular electrodes (or the first electrode layer includes N annular electrodes).

P voltages are generated by using the voltage control circuit and the power supply, where P is an integer greater than or equal to N.

That the plurality of voltages are applied to the electric field generated by the two electrode layers of the liquid crystal lens layer, so that at least one liquid crystal lens region generates at least one focal point includes:

N voltages that are in the P voltages and that are not exactly the same are applied to the first electrode layer or the second electrode layer to form a first electric field, where the first electric field is used to rotate liquid crystal molecules in at least one liquid crystal lens region at the first liquid crystal lens layer, and the rotated liquid crystal molecules are used to converge or diverge polarized light in a first direction to form at least one first focal point.

The foregoing has described in detail the method for implementing optical defocus in embodiments of this disclosure with reference to FIG. 13. The following describes in detail an apparatus for implementing optical defocus according to an embodiment of this disclosure with reference to FIG. 14.

Figure 14:
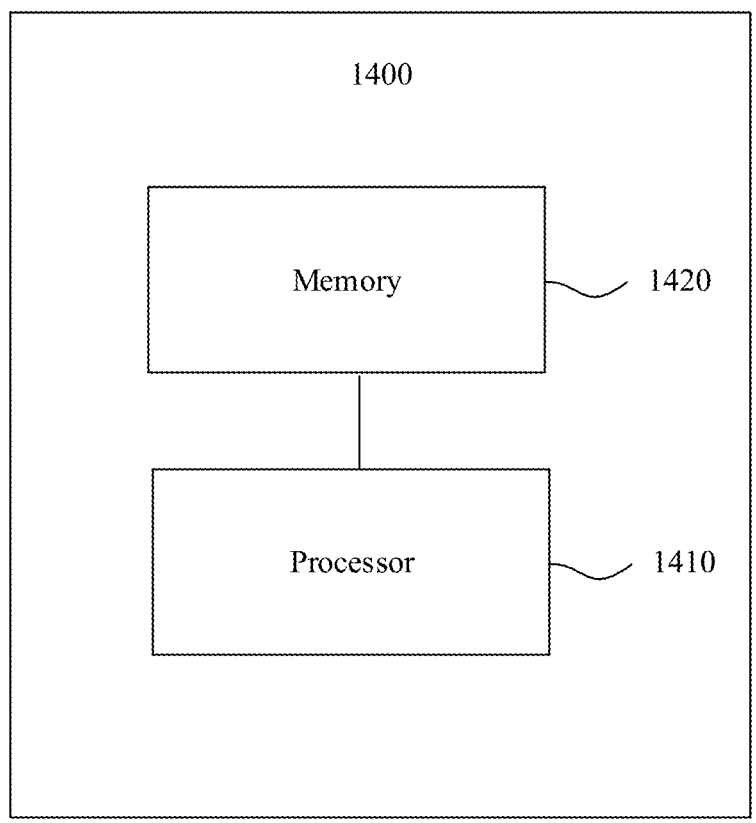
FIG. 14 is a schematic diagram of a structure of an apparatus 1400 for implementing optical defocus according to an embodiment of this disclosure.

FIG. 14 is a schematic diagram of a structure of an apparatus 1400 for implementing optical defocus that is applicable to an embodiment of this disclosure, which may be used to implement functions of the foregoing apparatus for implementing optical defocus.

The apparatus 1400 for implementing optical defocus includes a processor 1410 and a memory 1420. The memory 1420 stores instructions or a program. The processor 1410 is configured to execute or invoke the instructions or the program stored in the memory 1420, so that the apparatus 1400 for implementing optical defocus implements the functions of the apparatus for implementing optical defocus in the foregoing method for implementing optical defocus. When the instruction or the program stored in the memory 1420 is executed, the processor 1410 is configured to perform the method procedure in the embodiment shown in FIG. 13.

One of ordinary skilled in the art may understand that, for ease of description, FIG. 14 shows only one memory and only one processor. An actual apparatus for implementing optical defocus may include a plurality of processors and a plurality of memories. The memory may also be referred to as a storage medium, a storage device, or the like. This is not limited in an embodiment of the disclosure.

The descriptions of procedures corresponding to the foregoing accompanying drawings have respective focuses. For a part that is not described in detail in a procedure, refer to related descriptions of another procedure.

An embodiment of this disclosure further provides a computer-readable storage medium. The computer-readable storage medium includes program instructions. When the program instructions are directly or indirectly executed, the foregoing method is implemented.

An embodiment of this disclosure further provides a computer program product including instructions. When the computer program product runs on a computing device, the computing device is enabled to perform the foregoing method, or the computing device is enabled to implement a function of the foregoing apparatus.

An embodiment of this disclosure further provides a chip system. The chip system includes at least one processor, and when program instructions are executed in the at least one processor, the foregoing method is implemented.

All or some of the foregoing embodiments may be implemented using software, hardware, firmware, or any combination thereof. When software is used to implement embodiments, the foregoing embodiments may be all or partially implemented in a form of a computer program product. The computer program product includes one or more computer instructions or computer programs. When the computer instructions or the computer programs are loaded and executed on the computer, the procedure or functions according to embodiments of this disclosure are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one web site, computer, server, or data center to another web site, computer, server, or data center in a wired (for example, infrared, radio, and microwave, or the like) manner. The computer-readable storage medium may be any usable medium that can be accessed by the computer, or a data storage device, for example, a server or a data center in which one or more usable media are integrated. The usable medium may be a magnetic medium (for example, a floppy disk, a hard disk drive, or a magnetic tape), an optical medium (for example, a digital versatile disc (DVD)), a semiconductor medium, or the like. The semiconductor medium may be a solid state disk.

It should be understood that the term "and/or" in this specification describes only an association relationship between associated objects and represents that three relationships may exist. For example, A and/or B may represent the following three cases: only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this disclosure, "at least one" means one or more, and "a plurality of" means two or more. At least one of the following items (pieces) or a similar expression thereof indicates any combination of these items, including a single item (piece) or any combination of a plurality of items (pieces). For example, at least one item (piece) of a, b, or c may represent: a, b, c, a and b, a and c, b and c, or a, b, and c, where a, b, and c may be singular or plural.

It should be understood that, in embodiments of this disclosure, sequence numbers of the foregoing processes do not mean execution sequences. The execution sequences of the processes should be determined based on functions and internal logic of the processes, and should not constitute any limitation on implementation processes of embodiments of this disclosure.

One of ordinary skilled in the art may be aware that, in combination with the examples described in embodiments disclosed in this specification, units, modules, and algorithm operations may be implemented by electronic hardware or a combination of computer software and electronic hardware. Whether the functions are performed by hardware or software depends on particular applications and design constraint conditions of the technical solutions. One of ordinary skilled in the art may use different methods to implement the described functions for each particular application, but it should not be considered that the implementation goes beyond the scope of this disclosure.

It may be clearly understood by one of ordinary skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this disclosure, it should be understood that the disclosed system, apparatus and method may be implemented in other manners. For example, the described apparatus embodiment is merely an example. For example, division into the units is merely logical function division and may be other division in an embodiment. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected according to an actual requirement to achieve the objectives of the solutions of embodiments. Functional units in embodiments of this disclosure may be integrated into one processing unit, or each of the units may exist alone physically, or two or more units are integrated into one unit.

When the function is implemented in a form of a software functional unit and sold or used as an independent product, the function may be stored in a computer-readable storage medium. Based on such an understanding, the technical solutions in this disclosure essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in embodiments of this disclosure. The foregoing storage medium includes any medium that can store program code, for example, a USB flash drive, a removable hard disk, a read-only memory (ROM), a random access memory (RAM), a magnetic disk, or an optical disc.

The foregoing descriptions are merely implementations of this disclosure, but are not intended to limit the protection scope of this disclosure. Any variation or replacement readily figured out by one of ordinary skilled in the art within the technical scope disclosed in this disclosure shall fall within the protection scope of this disclosure. Therefore, the protection scope of this disclosure shall be subject to the protection scope of the claims.

What is claimed is:

1. An optical defocus lens, comprising:
   a first lens layer having a concave lens, a convex lens, or a plano lens; and
   at least one liquid crystal lens layer, wherein a refractive index of liquid crystal molecules in each of the at least one liquid crystal lens layer is controlled by an electric field, to converge or diverge polarized light incident to a direction of each liquid crystal lens layer to form a focal point, wherein the at least one liquid crystal lens layer comprises:
   a first liquid crystal lens layer configured to converge or diverge polarized light in a first direction to form a first focal point, and
   a second liquid crystal lens layer configured to converge or diverge polarized light in a second direction to form a second focal point, wherein the second liquid crystal lens layer is different from the first liquid crystal lens layer, the second direction is different from the first direction, and positions of the first focal point and the second focal point are different.

2. The optical defocus lens according to claim 1, wherein the at least one liquid crystal lens layer comprises:
   a plurality of liquid crystal lens regions, wherein a refractive index of liquid crystal molecules in each of the plurality of liquid crystal lens regions is controlled by an electric field, to converge or diverge polarized light incident to a direction of each liquid crystal lens region to form a focal point.

3. The optical defocus lens according to claim 2, wherein focal powers of at least two of the plurality of liquid crystal lens regions are different.

4. The optical defocus lens according to claim 3, wherein liquid crystal molecules in different liquid crystal lens regions at the at least two liquid crystal lens regions are controlled by different electric fields, and voltages of the different electric fields are different; or
   liquid crystal materials of different liquid crystal lens regions at the at least two liquid crystal lens regions are different.

5. The optical defocus lens according to claim 1, wherein the first liquid crystal lens layer comprises:
   a first alignment layer, wherein an alignment direction of the first alignment layer is the first direction; and
   a second liquid crystal lens layer comprises:
   a second alignment layer, wherein an alignment direction of the second alignment layer is the second direction, and the first direction is orthogonal to the second direction; and that the first lens layer or the second liquid crystal lens layer in the at least one liquid crystal lens layer is configured to converge or diverge polarized light in a second direction to form a second focal point, wherein the second liquid crystal lens layer is configured to converge or diverge the polarized light in the second direction to form the second focal point.

6. The optical defocus lens according to claim 1, wherein the first lens layer comprises a first alignment layer, wherein an alignment direction of the first alignment layer is the first direction, the first liquid crystal lens layer configured to converge or diverge the polarized light in the first direction to form the first focal point;
   the second liquid crystal lens layer comprises a second alignment layer, wherein an alignment direction of the second alignment layer is the second direction; the first direction and the second direction are different but are not orthogonal;
   the second liquid crystal lens layer is configured to converge or diverge the polarized light in the second direction to form the second focal point; and
   the first lens layer is configured to converge or diverge polarized light in a third direction to form a third focal point, and a position of the third focal point is different from a position of the first focal point or a position of the second focal point.

7. The optical defocus lens according to claim 1, wherein when a magnitude of the electric field changes, the position of the focal point formed by the liquid crystal lens layer changes.

8. The optical defocus lens according to claim 1, wherein the liquid crystal lens layer comprises a transparent substrate and an annular electrode layer comprising a plurality of annular electrodes, wherein electrode lines of the plurality of annular electrodes are led out through the transparent substrate.

9. The optical defocus lens according to claim 8, wherein a high-impedance transparent material is filled between the plurality of annular electrodes.

10. The optical defocus lens according to claim 1, wherein the optical defocus lens further comprises a power supply and a voltage control circuit that are configured to generate the electric field.

11. Glasses, comprising:
a power supply,
a voltage control circuit, wherein the power supply and the voltage control circuit are configured to generate an electric field, and
an optical defocus lens,
comprising:
a first lens layer having a concave lens, a convex lens, or a plano lens, and
at least one liquid crystal lens layer, wherein a refractive index of liquid crystal molecules in each of the at least one liquid crystal lens layer is controlled by an electric field, to converge or diverge polarized light incident to a direction of each liquid crystal lens layer to form a focal point, wherein the at least one liquid crystal lens layer comprises:
a first liquid crystal lens layer configured to converge or diverge polarized light in a first direction to form a first focal point, and
a second liquid crystal lens layer configured to converge or diverge polarized light in a second direction to form a second focal point, wherein the second liquid crystal lens layer is different from the first liquid crystal lens layer, the second direction is different from the first direction, and positions of the first focal point and the second focal point are different.

12. The glasses according to claim 11, further comprising:
a glasses frame and glasses legs, wherein the power supply and the voltage control circuit are disposed on the glasses frame, at least one of the glasses legs or the optical defocus lens.

13. The glasses according to claim 11, wherein the at least one liquid crystal lens layer comprises:
a plurality of liquid crystal lens regions, wherein a refractive index of liquid crystal molecules in each of the plurality of liquid crystal lens regions is controlled by an electric field, to converge or diverge polarized light incident to a direction of each liquid crystal lens region to form a focal point.

14. A method for implementing optical defocus applied to an optical defocus lens, comprising:
converging or diverging, by a first liquid crystal lens layer in at least one liquid crystal lens layer, polarized light in a first direction under control of a first electric field to form a first focal point, wherein the optical defocus lens comprises a first lens layer and the at least one liquid crystal lens layer, the first lens layer is a concave lens, a convex lens, or a plano lens, and a refractive index of liquid crystal molecules in each of the at least one liquid crystal lens layer is controlled by an electric field; and
converging or diverging, by the first lens layer, polarized light in a second direction to form a second focal point, or
converging or diverging, by a second liquid crystal lens layer in the at least one liquid crystal lens layer, the polarized light in the second direction under control of a second electric field to form the second focal point, wherein
the second liquid crystal lens layer is different from the first liquid crystal lens layer, the second direction is different from the first direction, and positions of the first focal point and the second focal point are different.

15. The method according to claim 14, wherein each of the at least one liquid crystal lens layer comprises:
a plurality of liquid crystal lens regions, wherein a refractive index of liquid crystal molecules in each of the plurality of liquid crystal lens regions is controlled by an electric field, to converge or diverge polarized light incident to a direction of each liquid crystal lens region to form a focal point.

16. The method according to claim 15, wherein focal powers of liquid crystal molecules in the at least two of the plurality of liquid crystal lens regions are different.

17. The method according to claim 16, wherein liquid crystal molecules in different liquid crystal lens regions at the at least two liquid crystal lens regions are controlled by different electric fields, or liquid crystal materials of different liquid crystal lens regions at the at least two liquid crystal lens regions are different.

18. The method according to claim 14,
further comprising:
converging or diverging, by the first liquid crystal lens layer, the polarized light in the first direction under control of the first electric field to form the first focal point;
converging or diverging, by the second liquid crystal lens layer, the polarized light in the second direction under control of the second electric field to form the second focal point; and
converging or diverging, by the first lens layer, polarized light in a third direction to form a third focal point, wherein a position of the third focal point is different from a position of the first focal point or a position of the second focal point.

19. The method according to claim 14, further comprising:
adjusting, based on a change of a magnitude of the first electric field, the position of the first focal point formed by the first liquid crystal lens layer.

20. The method according to claim 14, further comprising:
generating the electric field based on a power supply and a voltage control circuit, wherein
the power supply and the voltage control circuit are disposed on the optical defocus lens, or are disposed on glasses comprising the optical defocus lens.

* * * * *